(12) United States Patent
Kawabe et al.

(10) Patent No.: US 11,787,086 B2
(45) Date of Patent: Oct. 17, 2023

(54) MOLDING METHOD AND MOLDING DEVICE FOR COMPOSITE SHEET

(71) Applicant: FUKUI PREFECTURAL GOVERNMENT, Fukui (JP)

(72) Inventors: Kazumasa Kawabe, Fukui (JP); Kohei Yamada, Fukui (JP); Keiichi Kondo, Fukui (JP); Hirofumi Iyo, Fukui (JP); Shin Kaechi, Fukui (JP)

(73) Assignee: FUKUI PREFECTURAL GOVERNMENT, Fukui (JP)

( * ) Notice: Subject to any disclaimer, the term of this patent is extended or adjusted under 35 U.S.C. 154(b) by 621 days.

(21) Appl. No.: 16/648,281

(22) PCT Filed: Sep. 20, 2019

(86) PCT No.: PCT/JP2019/036971
§ 371 (c)(1),
(2) Date: Mar. 18, 2020

(87) PCT Pub. No.: WO2020/066894
PCT Pub. Date: Apr. 2, 2020

(65) Prior Publication Data
US 2021/0206025 A1 Jul. 8, 2021

(30) Foreign Application Priority Data
Sep. 26, 2018 (JP) ................................. 2018-179668

(51) Int. Cl.
*B29B 11/00* (2006.01)
*B29B 15/00* (2006.01)
(Continued)

(52) U.S. Cl.
CPC .............. *B29B 11/12* (2013.01); *B29B 11/16* (2013.01); *B29B 15/10* (2013.01);
(Continued)

(58) Field of Classification Search
CPC ......... B29B 11/00; B29B 11/10; B29B 11/12; B29B 11/16; B29B 15/00; B29B 15/10
See application file for complete search history.

(56) References Cited

U.S. PATENT DOCUMENTS

2014/0174632 A1 6/2014 Roman et al.

FOREIGN PATENT DOCUMENTS

| JP | 55-82112 A | 6/1980 |
|---|---|---|
| JP | 58-31716 A | 2/1983 |

(Continued)

OTHER PUBLICATIONS

Yutaka Maeda, "New Applications and Market of Carbon Fiber", CMC Publishing Co., Ltd., Nov. 30, 2000, p. 51, first edition.
(Continued)

*Primary Examiner* — Jacob T Minskey
*Assistant Examiner* — Matthew Hoover
(74) *Attorney, Agent, or Firm* — Sughrue Mion, PLLC

(57) ABSTRACT

A molding method for a composite sheet used for manufacturing a thermosetting resin prepreg sheet in which a thermosetting resin material is impregnated into a fiber sheet includes: bringing a resin transfer sheet in which the thermosetting resin material of a predetermined thickness is carried on one surface of a transfer sheet into contact with one surface of the fiber sheet to be stacked on the fiber sheet. The resin transfer sheet and the fiber sheet in the stacked state are subjected to a heating treatment or heating and pressurizing treatment. The resin transfer sheet and the fiber sheet in the heated and stacked state is subjected to a cooling treatment or cooling and pressurizing treatment so that the thermosetting resin material is transferred to the fiber sheet and the thermosetting resin material is made to adhere to one surface side of the fiber sheet.

13 Claims, 7 Drawing Sheets

(51) Int. Cl.
    *B29B 11/12*      (2006.01)
    *B29B 11/16*      (2006.01)
    *B29B 15/10*      (2006.01)
    *B29K 101/10*         (2006.01)
    *B29K 307/04*         (2006.01)
    *B29K 309/08*         (2006.01)

(52) U.S. Cl.
    CPC ...... *B29K 2101/10* (2013.01); *B29K 2307/04* (2013.01); *B29K 2309/08* (2013.01)

(56) References Cited

FOREIGN PATENT DOCUMENTS

| | | |
|---|---|---|
| JP | 7-173305 A | 7/1995 |
| JP | 2001-277239 A | 10/2001 |
| JP | 2004-263086 A | 9/2004 |
| JP | 2012-246442 A | 12/2012 |
| JP | 2013-159723 A | 8/2013 |
| JP | 2014-208457 A | 11/2014 |
| JP | 2018-516186 A | 6/2018 |
| WO | 2015/060299 A1 | 4/2015 |
| WO | 2017/022607 A1 | 2/2017 |

OTHER PUBLICATIONS

Extended European Search Report dated Oct. 15, 2021 from the European Patent Office in European Application No. 19865361.0.
International Search Report dated Nov. 26, 2019 in International Application No. PCT/JP2019/036971.

US 11,787,086 B2

MOLDING METHOD AND MOLDING DEVICE FOR COMPOSITE SHEET

CROSS REFERENCE TO RELATED APPLICATIONS

This application is a National Stage of International Application No. PCT/JP2019/036971 filed Sep. 20, 2019, claiming priority based on Japanese Patent Application No. 2018-179668 filed Sep. 26, 2018.

TECHNICAL FIELD

The present invention relates to a molding method and a molding device for obtaining a composite sheet in which a thermosetting resin material such as an epoxy resin and an unsaturated polyester resin is carried on one surface of a fiber sheet made of a reinforced fiber bundle such as carbon fiber and glass fiber in a sheet form.

BACKGROUND ART

A conventional fiber-reinforced composite material with the thermosetting resin as a matrix resin has a lighter weight and is more excellent in specific strength and specific rigidity as compared with a metal material and has higher elasticity and higher strength than those of only the resin material. Thus, it is the material attracting attention in various fields including aerospace, automobile, civil engineering/construction, exercise tools and the like.

A molded product of the fiber-reinforced composite material is manufactured as a laminated molded body having a required shape in which a thermosetting resin material is impregnated into a reinforced fiber bundle by forming a laminated article in which sheet-shaped prepreg sheets obtained by impregnating the thermosetting resin material which is to be a matrix into a fiber sheet made of the reinforced fiber bundle of carbon fiber, glass fiber and the like are laminated in various directions and by subjecting the laminated article to autoclave molding, heated press molding and the like in many cases.

A manufacturing method for the prepreg sheet in which the thermosetting resin material is impregnated into the fiber bundle is described separately as a wet method and a dry method (hotmelt method) in Non Patent Literature 1. The wet method is a method of immersing the fiber bundle in a solution obtained by diluting the thermosetting resin material with a solvent. This is a method excellent in impregnation characteristics of the resin into the fiber bundle, but an evaporation/drying process of the solvent is needed, and a defect by the remaining solvent can occur in the sheet in some cases. In the dry method (hotmelt method), since the thermosetting resin material is directly impregnated into the fiber bundle, and the solvent treatment process is not needed, a reliable prepreg sheet can be manufactured without a bad influence on the sheet.

As a manufacturing method for a prepreg sheet in which the fibers by the dry method (hotmelt method) are reinforced in one direction, a method as below is illustrated, for example, in Figure of Non Patent Literature 1.

Fiber bundles are pulled in a sheet form out of a creel stand on which a plurality of bobbins with the carbon fiber bundles wound thereon are set. Then, the fiber bundles in the sheet form with both surfaces sandwiched by resin coated paper in which a resin is applied to release paper is passed through a heating and pressurizing unit and is worked into a prepreg sheet in which the thermosetting resin material is impregnated into the fiber bundles. After that, the release paper on one of the surfaces of the prepreg sheet is peeled off the prepreg sheet, while the other is bonded to one surface of the prepreg sheet and is taken up by a bobbin or the like.

CITATION LIST

Non Patent Literature

Non Patent Literature 1: "New Applications and Market of Carbon Fiber" written and edited by Yutaka Maeda, published by CMC Publishing Co., Ltd., first edition issued on Nov. 30, 2000, p. 51

SUMMARY OF INVENTION

Technical Problem

When a prepreg sheet with a heavy fiber base weight, that is, of a thick layer is to be manufactured by the aforementioned dry method (hotmelt method), the thermosetting resin material is impregnated into the fiber bundles in the sheet form from both upper and lower surfaces, but since fibers of the fiber bundles in a thickness direction has more fibers, even if viscosity of the thermosetting resin material is lowered by heating, impregnation time of the thermosetting resin becomes longer, that is, a working speed is slowed, which is a problem. Moreover, there is a problem that a void can be generated easily in the fiber bundle. Furthermore, since an impregnation distance of the thermosetting resin material also becomes longer, each fiber can easily meander in the thickness direction by a flow of the resin, the fibers in a straight state decrease, and dynamic characteristics of a molded product in which the thick-layered prepreg sheets are laminated can be deteriorated in some cases.

When the prepreg sheet with a light fiber base weight, that is, of a thin layer is to be manufactured by the aforementioned dry method (hotmelt method), since an amount of the thermosetting resin material to be applied to release paper is also small, impregnation of the thermosetting resin material into the fiber bundles is performed from either one of the surfaces of the fiber bundles in the sheet form. Thus, the thermosetting resin material moves from one surface of the fiber bundles, the resin is present in a larger amount on the surface of the fiber bundles on a side of the resin, while the resin is present in a smaller amount on the other surface of the fiber bundles. Thus, even if an inter-fiber moving distance of the resin is shortened by the thin layer, it is difficult to expedite the working speed for uniform resin impregnation.

If the thermosetting resin material is not present uniformly in the thickness direction in the prepreg sheet, a tacking performance on the prepreg sheet surface becomes varied, which can easily lead to a trouble that the prepreg sheet is not bonded at automatic lamination of the prepreg sheets. Moreover, the amount of the thermosetting resin material in the thickness direction in a completed molded product becomes ununiform, which can influence the dynamic characteristics in some cases.

Moreover, since the release paper which is a subsidiary material is used in a vertically sandwiching form, a length twice of the prepreg sheet production length is needed. Furthermore, since the lease paper is subjected to loads of heating or heating and pressurizing in a process of application of the thermosetting resin material and a process of manufacturing the prepreg sheet, repeated use is limited.

Particularly, with manufacture of the prepreg sheet, the release paper subjected to the load of large pressure in a state at a high heating temperature can have a rough surface state, or a degree of release can be varied and thus, re-application of the thermosetting resin material becomes difficult, and the sheet can be no longer reused as resin coat paper in many cases. Thus, use of a large quantity of the release paper which is the subsidiary material is also a problem from a viewpoint of a production cost in manufacture of the prepreg sheet.

Moreover, when the prepreg sheet with a light fiber base weight, that is, of a thin layer is to be made, use of the release paper with respect to a production weight is further increased and thus, a cost of the release paper as the subsidiary material is more important as a problem in manufacture of the thin-layered prepreg sheet.

Thus, the present invention has an object to provide a molding method and a molding device for obtaining a composite sheet which enables manufacture of the thermosetting resin prepreg sheet with a high quality and at a high speed with less use of the release paper which is the subsidiary material.

Solution to Problem

A molding method for a composite sheet according to the present invention is a molding method for a composite sheet used for manufacturing a thermosetting resin prepreg sheet in which a fiber sheet is impregnated with a thermosetting resin material, wherein a resin transfer sheet and includes bringing a thermosetting resin material of a predetermined thickness is carried on one surface of a transfer sheet into contact with one surface of the fiber sheet to be stacked on the fiber sheet; subjecting the resin transfer sheet and the fiber sheet in the stacked state to a heating treatment or heating and pressurizing treatment; and subjecting the resin transfer sheet and the fiber sheet in the heated and stacked state to a cooling treatment or cooling and pressurizing treatment so that the thermosetting resin material is transferred to the fiber sheet and the thermosetting resin material is made to adhere to one surface side of the fiber sheet. Moreover, when the resin transfer sheet and the fiber sheet in the stacked state are subjected to the heating treatment or heating and pressurizing treatment, a heating temperature is within a range from 30 to 80° C., and viscosity of the thermosetting resin material at the heating temperature is 100000 Pa·s or less. Moreover, assuming that density of the fibers included in the fiber bundle is $\rho_C$ g/cm$^3$, a base weight of the fiber sheet is $W_C$ g/m$^2$, density of the thermosetting resin material is $\rho_R$ g/cm$^3$, and base weight of the thermosetting resin material carried on the transfer sheet is $W_R$ g/m$^2$, a thickness when the thermosetting resin material is integrated to the one surface side of the fiber sheet is $[\{(W_C/\rho_C)/1000\}+\{(W_R/\rho_R)/1000\}]$ mm or more. Moreover, the thermosetting resin material is brought into contact with the one surface of the fiber sheet while the thermosetting resin material is carried on the one surface of the transfer sheet. Moreover, the fiber sheet has a base weight of 10 to 80 g/m$^2$. Moreover, the thermosetting resin material carried on the transfer sheet has a base weight of 10 to 55 g/m$^2$. Moreover, the thermosetting resin material carried on the transfer sheet is carried by being applied on the transfer sheet. Moreover, the transfer sheet is formed in an endless state. Moreover, the fiber sheet is formed by an opening treatment. Moreover, after the resin transfer sheet is brought into contact with the one surface of the fiber sheet to be stacked on the fiber sheet, a release sheet is brought into contact with the other surface of the fiber sheet not in contact with the resin transfer sheet to be stacked on the fiber sheet.

A manufacturing method for a thermosetting resin prepreg sheet according to the present invention includes impregnating, by the heating and pressurizing treatment, a thermosetting resin material into a fiber bundle of a composite sheet molded by the molding method for a composite sheet described in any one of the above to form the thermosetting resin prepreg sheet. Moreover, another fiber sheet is made to adhere to a surface side of the composite sheet to which the thermosetting resin material was transferred, and the thermosetting resin material is impregnated into both of the fiber sheets. Moreover, a plurality of the composite sheets are stacked and molded by heating and pressurizing. Moreover, the release sheet formed in the endless state is stacked on the composite sheet and molded by heating and pressurizing.

A molding device for a composite sheet according to the present invention is a molding device for a composite sheet used for manufacturing a thermosetting resin prepreg sheet in which a thermosetting resin material is impregnated into a fiber sheet, includes a resin transfer sheet supply portion which supplies a resin transfer sheet in which the thermosetting resin material of a predetermined thickness is carried on one surface of a transfer sheet; a fiber sheet supply portion which supplies the fiber sheet; a transfer heating treatment portion which applies a heating treatment or heating and pressurizing treatment to the thermosetting resin material carried on the transfer sheet in a state in contact with the one surface of the fiber sheet; and a transfer cooling treatment portion which applies a cooling treatment or cooling and pressurizing treatment to the resin transfer sheet and the fiber sheet in a state treated by the transfer heating treatment portion and stacked, in which the composite sheet in which the thermosetting resin material is made to adhere to the one surface side of the fiber sheet is molded. Moreover, the resin transfer sheet supply portion includes a carrying portion which causes the thermosetting resin material of a predetermined thickness to be carried in a sheet form on one surface of the transfer sheet. Moreover, the fiber sheet supply portion includes an opening treatment portion which forms the fiber sheet by an opening treatment.

The manufacturing device for a thermosetting resin prepreg sheet according to the present invention includes the molding device for a composite sheet described in any one of the above and an impregnation treatment portion which impregnates a thermosetting resin material into a fiber bundle of the composite sheet by the heating and pressurizing treatment to form a thermosetting resin prepreg sheet. Moreover, the impregnation treatment portion causes another fiber sheet to adhere to the composite sheet on a surface side to which the thermosetting resin material was transferred. Moreover, the impregnation treatment portion causes a plurality of the composite sheets to be stacked and molded by heating and pressurizing.

Since the present invention includes the aforementioned configuration, the composite sheet in which the thermosetting resin material of a predetermined thickness is made to transfer and to adhere to the one surface side of the fiber sheet can be molded efficiently. Since the thermosetting resin material does not have to impregnate into the entire fiber sheet in the composite sheet, molding can be made at a high speed, and a use amount of the release paper or release sheet required at the impregnation can be kept to the minimum.

Moreover, since the obtained composite sheet is in a state where the thermosetting resin material of the predetermined thickness adheres to the one surface side of the fiber sheet, the sheet is hardly torn and can be handled easily by presence of a resin layer part as compared with the case impregnated with the thermosetting resin.

By stacking the plurality of composite sheets and subjecting them to the impregnation treatment, the thermosetting resin material is impregnated into the fiber sheet uniformly in a short time, and the thermosetting resin prepreg sheet can be manufactured at a high speed in a high quality state with excellent straightness and resin impregnation performance of fibers.

Moreover, since the composite sheets are stacked and treated, even if the pressurizing force is lowered, the prepreg sheet can be manufactured with good resin impregnation characteristics, and since the pressurizing force is lowered, damage to the release paper or release sheet which is a subsidiary material can be reduced, and repeated use is made possible. Thus, the use amount of the release paper or release sheet which is a subsidiary material can be reduced in total.

BRIEF DESCRIPTION THE DRAWINGS

DESCRIPTION OF EMBODIMENTS

Embodiments of the present invention will be described below in detail. The embodiments described below are preferable specific examples to implement the present invention and have various technical restrictions but the present invention is not limited to these forms unless the invention is limited explicitly in the following description.

Figure 1:
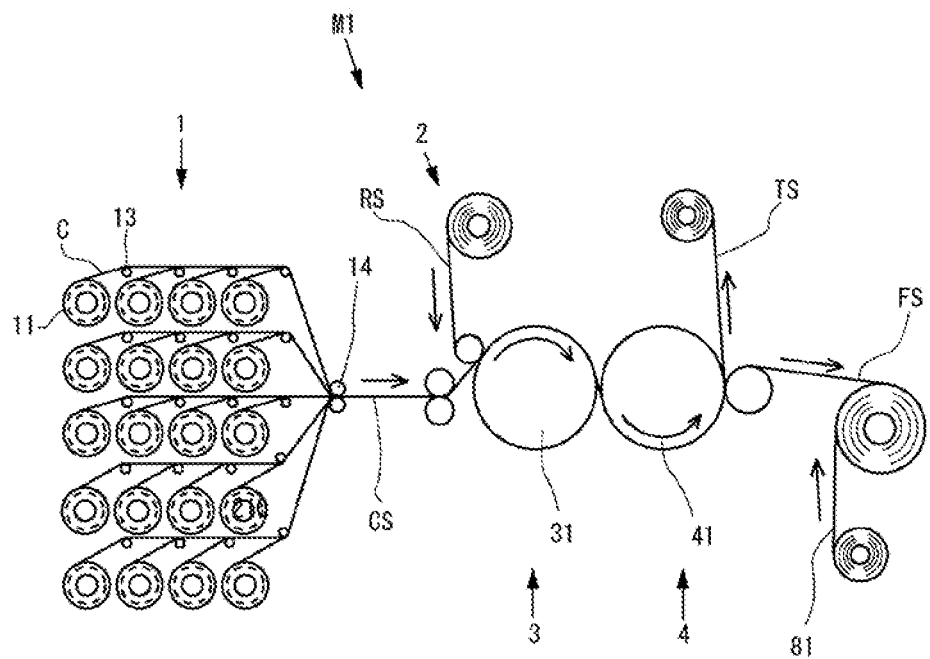
FIG. 1 is an outline side view related to a molding device for a composite sheet according to the present invention.

FIG. 1 is an outline side view related to a molding device for a composite sheet according to the present invention. The molding device M1 of the composite sheet of the present invention is configured at least by a fiber sheet supply portion 1, a resin transfer sheet supply portion 2, a transfer heating treatment portion 3, and a transfer cooling treatment portion 4.

In the fiber sheet supply portion 1, sets of bobbins 11 around each of which a fiber bundle C is wound are provided, a plurality of fiber bundles C are pulled out with a certain tension by a brake mechanism, not shown, runs on a width position guide roll 13 and a height position guide roll 14, becomes a fiber sheet CS in a sheet form and is supplied to a subsequent process.

The fiber sheet supply portion 1 may be so configured that a plurality of rolls (not shown) are arranged on a downstream side in a running direction of the height position guide roll 14 so that the plurality of fiber bundles C in a sheet form are passed through the plurality of rolls in a staggered manner, and some of the plurality of rolls are vibrated in the width direction so as to rub the plurality of fiber bundles C in the width direction and to open them to some degree.

Fiber materials used for the fiber bundle C include a reinforced fiber bundle made of high strength fibers such as a carbon fiber bundle, a glass fiber bundle, an aramid fiber bundle, and a ceramics fiber bundle. The number of collected fibers in the fiber bundle may be, for example, mainly 12000 to 24000 for the carbon fiber bundle, but the fiber bundle with the number of collected fibers exceeding 24000 (48000, for example) can be used in the present invention.

As the fiber sheet CS, a woven sheet material or a knitted sheet material by the reinforced fiber bundle may be used.

In the resin transfer sheet supply portion 2, the bobbin around which a resin transfer sheet RS in which a thermosetting resin material R is applied to a transfer sheet TS is wound is set and configured such that the resin transfer sheet RS is pulled out with a certain tension by a brake mechanism, not shown, and is supplied to a subsequent process.

The transfer sheet TS is a sheet made of a continuous sheet of paper, a resin film, a metal sheet or the like in a sheet form, to which the thermosetting resin material can be applied to one surface without being repelled, and is a sheet having release characteristics that the thermosetting resin material does not remain on the sheet surface when the applied thermosetting resin material is to be transferred to the fiber sheet. A release treatment to such a degree that the thermosetting resin material is applied is executed on the one surface of the transfer sheet TS, but the other surface is not subjected to the release treatment in some cases or treatment of making release of the thermosetting resin material easier than the release treatment on the opposite surface is executed in other cases.

The transfer sheet TS may use any material as long as it has the release characteristics from the thermosetting resin material R. It includes synthetic resin-based films of single polymer or copolymer of polyolefin-based resins such as a low-density polyethylene resin, a high-density polyethylene resin, and a polypropylene resin or a single polymer or a copolymer of a polyester-based resin such as polyethylene terephthalate (PET) and a polybutylene terephthalate or a mixture of them or the like. Moreover, paper, an unwoven cloth, and a metal sheet are included, and the synthetic resin-based film, paper, the metal sheet are suitable among them.

In the aforementioned transfer sheet TS, if the sheet itself has the release characteristics from the thermosetting resin material R, it can be used as it is in that state. Moreover, if it does not have the release characteristics from the thermosetting resin material R, the release treatment is applied to one surface or both surfaces of the aforementioned transfer sheet TS. As the release treatment, the release treatment may be applied by a silicone resin-based releasing agent, an alkyd resin-based releasing agent, a long-chain alkyl-based compound releasing agent, a fluorine-based releasing agent, a polyimide-based releasing agent and the like in some cases, and a resin film having the release characteristics from the thermosetting resin material R such as polyester, polyethylene, and polypropylene is bonded and subjected to a lamination treatment in other cases.

When the one surface of the transfer sheet TS to which the thermosetting resin material R is not applied is subjected to the release treatment, the resin transfer sheet RS in which the thermosetting resin material R is applied to the one surface of the transfer sheet TS can be wound up into a bobbin shape as it is. However, if the surface of the transfer sheet TS to which the thermosetting resin material R is not applied is not subjected to the release treatment, immediately after the thermosetting resin material R is applied to the one surface of the transfer sheet TS so as to make it the resin transfer sheet RS, an olefin-based cover film such as a polyethylene film is stacked on the surface to which the thermosetting resin material R is applied and wound up into the bobbin shape. As a result, winding-up into the bobbin shape can be realized while adhesion of the thermosetting resin material R to the one surface of the transfer sheet TS to which the thermosetting resin material R is not applied is prevented.

When the resin transfer sheet RS is into the bobbin shape with the cover film stacked on the applied thermosetting resin material R, in the resin transfer sheet supply portion 2 in the molding device for the composite sheet in FIG. 1, the resin transfer sheet RS needs to be supplied to the subsequent process while taking up the cover film by a taking-up mechanism, not shown, in a process of winding out the resin transfer sheet RS set on the bobbin.

As the thermosetting resin material, such a resin is preferable that is cured by energy such as heat, light, and an electron beam and whose viscosity is lowered when heated until thickening occurs by a curing reaction and the like. Such resins include an epoxy resin, an unsaturated polyester resin, a vinyl ester resin, and a phenol resin, for example. Particularly, the epoxy resin is preferably used and is used generally in combination with a curing agent and a curing catalyst and moreover, additives such as a toughness imparting agent.

As targets of viscosity and a state of the thermosetting resin material, a thermosetting resin material with the viscosity within a range from 1 to 10 Pa·s flows easily and is in a state easily impregnated into the fiber bundle. It is a viscosity range when the prepreg sheet in which the thermosetting resin material is impregnated into the fiber bundle is to be manufactured. When the viscosity is 1000 Pa·s or less, it has fluidity capable of being kneaded and is the viscosity in a state capable of uniform coating with a certain thickness on the transfer sheet. When it becomes 1000 Pa·s or more, the state becomes semi-solid, and when the viscosity becomes further higher, fluidity becomes smaller. When it reaches 100000 Pa·s, fluidity does not occur without a considerable pressurizing force, but the state has tackiness, that is, adhesiveness. At 100000 Pa·s or more, the tackiness, that is, adhesiveness becomes smaller.

In the present invention, it is preferable that the thermosetting resin material R is in a state where it cannot flow easily without pressurization at a normal temperature but the fluidity increases when heated, and tackiness, that is, adhesiveness is improved. In heating, a heating temperature within a range from 30 to 80° C. is preferable so that a curing reaction of the thermosetting resin material is not promoted, deterioration of the transfer sheet by an influence of heating can be prevented, and cooling after the heating can be made in a short time. In order for the thermosetting resin material to have the tackiness, that is, the adhesiveness at the heating temperature, viscosity of the thermosetting resin material is preferably 100000 Pa·s or less. If the viscosity is 100000 Pa·s or more, the tackiness, that is, the adhesiveness becomes smaller, and though adhesion to the fiber sheet CS is possible, a degree of adhesion becomes weak and insufficient. Moreover, since it can be partial adhesion, when the sheet in this state is to be peeled off the transfer sheet, it becomes difficult to peel the applied thermosetting resin material off the transfer sheet.

When the thermosetting resin material is made to adhere to the one surface of the fiber sheet CS, if the viscosity of the thermosetting resin material is 1000 Pa·s or more in the state at the heating temperature, the thermosetting resin material R is brought into a semi-solid state and formed in a layered state, and it becomes possible to adhere to the fiber sheet CS. As a composite sheet FS in which the thermosetting resin material R is formed in the layered state on the one surface of the fiber sheet CS, when the thermosetting resin prepreg sheet using the composite sheet FS is made, the thermosetting resin material can be easily impregnated into the fiber sheet CS uniformly in the thickness direction, and the thermosetting resin prepreg sheet can be made at a high speed and with a high quality.

Moreover, in the present invention, the viscosity of the thermosetting resin material is preferably 10000 Pa·s or more in a normal temperature state. This is because if the viscosity is 10000 Pa·s or more, after the thermosetting resin material applied to the transfer sheet TS has transferred to the fiber sheet CS, when it is to be peeled off the transfer sheet, the thermosetting resin material can be cleanly peeled off the entire surface without partial remains.

The fiber sheet CS supplied from the fiber sheet supply portion 1 and the resin transfer sheet RS supplied from the resin transfer sheet supply portion 2 are supplied to the transfer heating treatment portion 3 such that the surface of the thermosetting resin material R in the resin transfer sheet RS is stacked on one surface of the fiber sheet CS. In the transfer heating treatment portion 3, the stacked fiber sheet CS and resin transfer sheet RS are heated, the viscosity of the thermosetting resin material R applied to the resin transfer sheet RS is lowered to a state where the tackiness, that is, the adhesiveness is improved, and the thermosetting resin material R is made to adhere to the one surface of the fiber sheet.

When the thermosetting resin material in a solid state at a normal temperature, the tackiness, that is, the adhesiveness is small. Thus, it is difficult to cause the thermosetting resin material to adhere to the one surface of the fiber sheet. If the thermosetting resin material is stacked on the fiber sheet with the small tackiness or stacked by pressurization, there is a possibility that partial adhesion occurs. However, in the sheet in this state, the thermosetting resin material and the fiber sheet are easily peeled off each other entirely or partially. If a tension is applied to the sheet in this state, wrinkles or width shrinkage can occur easily in the fiber sheet, and handling as a sheet becomes difficult.

In FIG. 1, the transfer heating treatment portion 2 has a mechanism in which a heating roll 31 is connected to a driving motor, not shown, and the heating roll 31 heated to a certain temperature is rotated at a certain speed. The stacked fiber sheet CS and resin transfer sheet RS are brought into contact with the surface of the heating roll 31 and made to run. The longer a contact length is, the longer heating time for the fiber sheet CS and the resin transfer sheet RS becomes. Moreover, since the tension is applied to the stacked fiber sheet CS and resin transfer sheet RS, when they are brought into contact with the heating roll 31, a pressurizing force acts on the stacked fiber sheet CS and resin transfer sheet RS to be pressed to a center direction of the heating roll 31. Thus, the thermosetting resin material R applied to the resin transfer sheet RS is pressurized to the one surface of the fiber sheet CS, and it can adhere to or penetrate among the fibers easily. The number of the heating rolls 31 is one in FIG. 1, but two or more may be aligned so as to prolong the contact length of the stacked fiber sheet CS and resin transfer sheet RS with the heating rolls for running. As a result, the thermosetting resin material R can be sufficiently heated even if a molding speed is expedited.

As a method of applying a tension to the fiber sheet CS and the resin transfer sheet RS, the tension can be applied to the entire fiber sheet CS by connecting the brake mechanism, not shown, to each of thread feeders 11, applying the certain tension to the fiber bundle C and by winding it out in the fiber sheet supply portion 1, for example. In the resin transfer sheet supply portion 2, the certain tension can be applied to the resin transfer sheet RS by connecting the brake mechanism, not shown, to the bobbin around which the resin transfer sheet RS is wound. Moreover, immediately after the resin transfer sheet RS is stacked on the fiber sheet CS, a certain tension is applied by a tension applying mechanism, not shown, and they can be supplied to the transfer heating treatment portion 31.

The viscosity and the tackiness of the thermosetting resin material R can be adjusted by controlling the heating temperature of the heating roll 31. Moreover, by controlling the tension applied to the fiber sheet CS and the resin transfer sheet RS, the pressurizing force of the thermosetting resin material R on the one surface of the fiber sheet CS can be adjusted. By adjusting and setting the heating temperature and the pressurizing force, the thermosetting resin material R can be made to adhere to the fiber sheet CS formed in the layered state, not in a fluid state with lowered viscosity.

The stacked fiber sheet CS and resin transfer sheet RS having passed through the transfer heating treatment portion 3 are supplied to the transfer cooling treatment portion 4. In the transfer cooling treatment portion 4, the heated and stacked fiber sheet CS and resin transfer sheet RS are cooled, the viscosity of the thermosetting resin material R adhering to the one surface of the fiber sheet CS is increased and is brought into a solid state.

In FIG. 1, the transfer cooling treatment portion 4 has a mechanism in which a cooling roll 41 is connected to a driving motor, not shown, and the cooled cooling roll 41 is rotated at a certain speed. The heated and stacked fiber sheet CS and resin transfer sheet RS are brought into contact with the surface of the cooling roll 41 and made to run. The longer the contact length is, the longer cooling time for the fiber sheet CS and the resin transfer sheet RS becomes. Moreover, since the tension is applied to the stacked fiber sheet CS and resin transfer sheet RS, when they are brought into contact with the cooling roll 41, a pressurizing force acts on the stacked fiber sheet CS and resin transfer sheet RS to be pressed to a center direction of the cooling roll 41. Thus, the viscosity of the thermosetting resin material R adhering to the one surface of the fiber sheet CS is increased by the cooling and is brought into a solid state. The number of the cooling rolls 41 is one in FIG. 1, but two or more may be aligned so as to prolong the contact length of the stacked fiber sheet CS and resin transfer sheet RS with the cooling rolls for running. As a result, the thermosetting resin material R can be sufficiently cooled even if the molding speed is expedited.

A cooling temperature of the cooling roll 41 only needs to be such that, even if the thermosetting resin material R is semi-solid, the viscosity is increased, and peeling off the transfer sheet TS is realized. In the present invention, the viscosity of the thermosetting resin material R is preferably in a state at 10000 Pa·S or more.

The stacked fiber sheet CS and resin transfer sheet RS having passed through the transfer cooling treatment portion 4 are in a state where the composite sheet FS in which the thermosetting resin material R applied to the resin transfer sheet RS is transferred to and made to adhere to the one surface of the fiber sheet CS is stacked on the transfer sheet TS on the surface of the composite sheet FS on the thermosetting resin material side.

Figure 2:
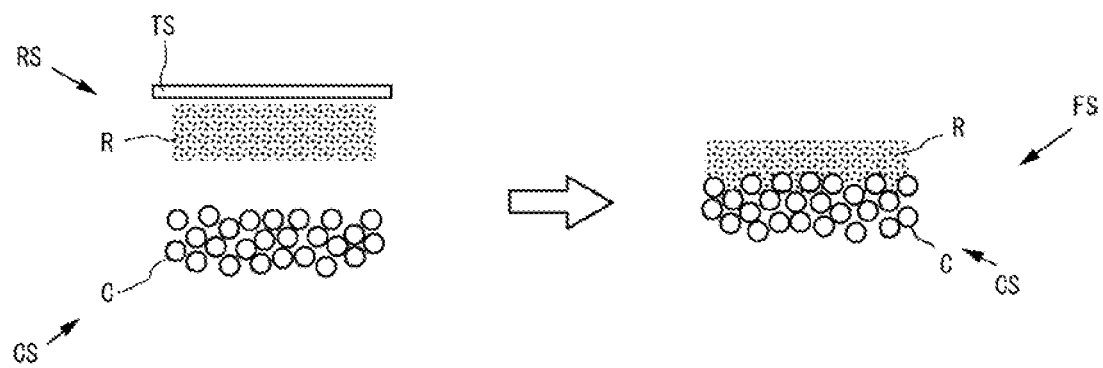
FIG. 2 is an explanatory view related to a molding method for the composite sheet according to the present invention.

Here, the adhesion of the thermosetting resin material to the one surface of the fiber sheet refers to a state in which the thermosetting resin is bonded to the surface of each fiber present on the one surface of the fiber sheet as in the explanatory view in FIG. 2 or a state in which the thermosetting resin material penetrates among fibers from the one surface of the fiber sheet, and the thermosetting resin material has impregnated into the middle in the fiber sheet. In this state, the fiber sheet is not separated wholly or partially from the thermosetting resin material in the solid state and they are integrated. Thus, wrinkles or width shrinkage does not occur easily in the fibers of this composite sheet FS in this state even if a running tension is applied, and handling performances as the sheet are also improved.

Moreover, methods for checking the state in which the thermosetting resin material R adheres to the one surface of the fiber sheet CS and they are integrated include a method of directly observing the section thereof or a method by calculation. The directly observing method includes a method in which the composite sheet FS is solidified by wax called paraffin and then, a flake sample is made by a microtome for flaking it with a cutter into a thickness of the unit of micron, and a section of the sample is observed by a magnifier such as a microscope.

The method by calculation is carried out such that, assuming that the density of the fibers included in the fiber bundle is $\rho_C$ g/cm$^3$, the base weight of the fiber sheet is $W_C$ g/m$^2$, the density of the thermosetting resin material is $\rho_R$ g/cm$^3$, and the base weight of the thermosetting resin material carried on the transfer sheet is $W_R$ g/m$^2$, when the thickness of the composite sheet FS in which the thermosetting resin material is made to adhere to the one surface side of the fiber sheet and they are integrated is $[\{(W_C/\rho_C)/1000\}+\{(W_R/\rho_R)/1000\}]$ mm or more, it is considered that the thermosetting resin material R is formed in the layered state and made to adhere to the one surface of the fiber sheet CS.

In the aforementioned calculation, $[\{(W_C/\rho_C)/1000\}+\{(W_R/\rho_R)/1000\}]$ mm is a thickness t when the thermosetting resin material R is impregnated into the fiber bundle of the fiber sheet CS without a void. If the thickness of the composite sheet FS is t or more, it means that the thermosetting resin material R is not impregnated into the fiber bundle. According to the molding method of the present invention, since the thermosetting resin material applied in the layered state on the transfer sheet adheres to the one surface of the fiber sheet, a portion of the thermosetting resin material not impregnated is considered to be formed in the layered state on the one surface of the fiber sheet CS as it is.

The transfer sheet TS stacked on the composite sheet FS having passed through the transfer cooling treatment portion 4 has the transfer sheet TS peeled off, and the peeled-off transfer sheet TS is taken up by the bobbin connected to the rotation driving motor, not shown, and the composite sheet FS is also taken up by another bobbin connected to the rotation driving motor, not shown. When the composite sheet FS is to be taken up by the bobbin, in order to prevent the thermosetting resin material R of the composite sheet FS from being brought into contact with the fiber sheet side of the composite sheet FS being taken-up and from partial adhering thereto, taking-up can be made by having a cover film 81 of a resin film or the like followed.

Paper, a resin film, metal sheet and the like with release characteristics can be used for the cover film, but since it is used at a normal temperature, an olefin-based film with release characteristics such as a polyethylene-based resin film, for example, can be used though heat resistance is low. Any material can be used as long as release characteristics from the thermosetting resin material R can be exerted. A resin film having release characteristics from the thermosetting resin material R such as polyester, polyethylene, and polypropylene, a sheet base material in which a release treatment is applied to the surface of paper, unwoven cloth, or the metal sheet and the like can be used.

The transfer sheet TS taken up by the bobbin runs through the transfer heating treatment portion and is subjected to a heating treatment or heating and pressurizing treatment, but it is heating or heating and pressurizing to such a degree that causes the thermosetting resin material applied to the transfer sheet to be transferred to and made to adhere to the fiber sheet, and unlike the case of impregnation of the thermosetting resin material into the fiber bundle, the heating temperature is low and the pressurizing force is small and thus, there is little deterioration or damage by the heating of the transfer sheet TS. Moreover, since the release characteristics on the surface is hardly deteriorated, the transfer sheet TS can be used repeatedly, and the use amount of the transfer sheet CS can be kept low.

Moreover, the present invention is the method of having the thermosetting resin material R applied to the resin transfer sheet RS transferred to and made to adhere to the one surface of the fiber sheet CS and is different from the impregnation into the fiber bundle and thus, the working speed can be also expedited. According to the experiments by the inventors and the like, the composite sheet FS in which the thermosetting resin material R is transferred to and made to adhere to the one surface of the fiber sheet CS can be obtained even at the working speed of 30 m/min or more.

When the stacked fiber sheet and resin transfer sheet are to be heated in contact with a heat source such as the heating roll as in FIG. 1, such a method is preferable that the fiber sheet is brought into contact with the heat source, and the resin transfer sheet is stacked on the surface thereof and heated. When the fiber sheet is heated, and the thermosetting resin material applied to the resin transfer sheet is heated, the thermosetting resin material can be heated more efficiently than heating of the transfer sheet and heating of the thermosetting resin material and can be bonded to the fiber sheet.

Moreover, when the stacked fiber sheet and resin transfer sheet in contact with a cooling source as the cooling roll in FIG. 1 are to be cooled, such a method is preferable that the transfer sheet side of the resin transfer sheet is brought into contact with the cooling source, and the fiber sheet on the surface opposite to it is also cooled. That is because the transfer sheet and the thermosetting resin material are sufficiently cooled by sufficiently cooling the transfer sheet of the resin transfer sheet and by cooling the thermosetting resin material applied to the surface on the side opposite to it, and when the transfer sheet is to be peeled off the completed composite sheet FS, it can be cleanly peeled off easily on the whole surface.

Figure 3:
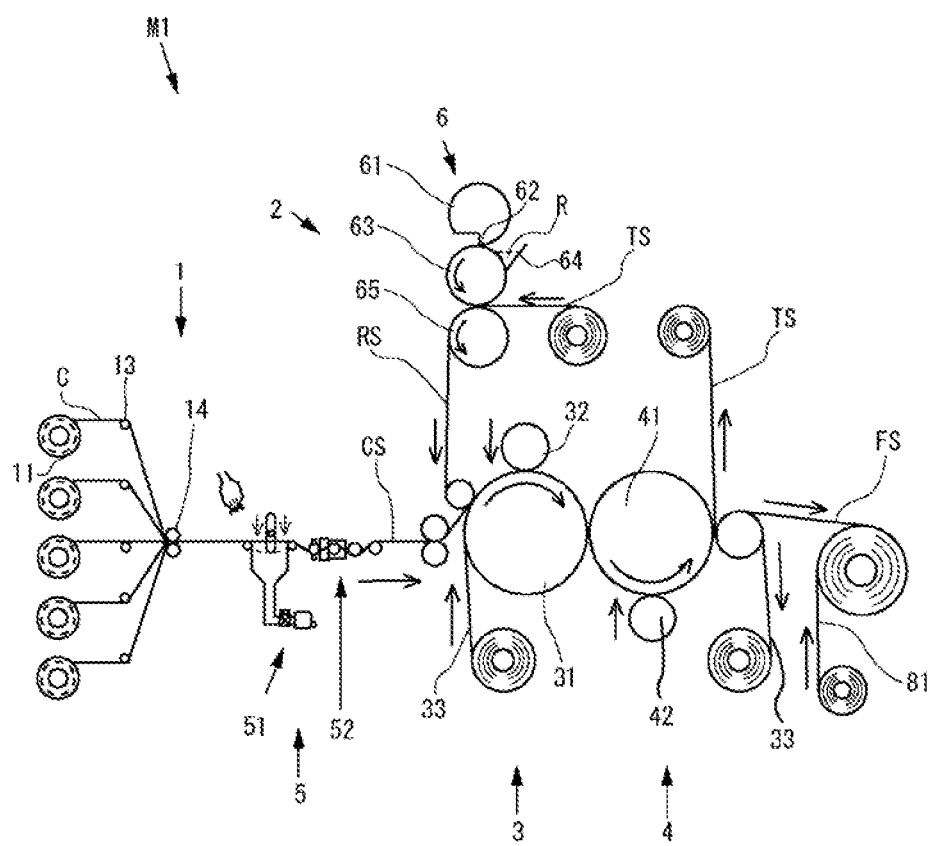
FIG. 3 is an outline side view related to another molding device for the composite sheet according to the present invention.

FIG. 3 is an outline side view related to another molding device for the composite sheet according to the present invention. The another molding device for the composite sheet in FIG. 3 has an opening treatment portion 5 configured in the fiber sheet supply portion 1 and a carrying portion 6 configured in the resin transfer sheet supply portion 2 in the molding device for the composite sheet in FIG. 1. Moreover, pressurizing rolls 32 and 42 are configured in the transfer heating treatment portion 3 and the transfer cooling treatment portion 4, respectively, and such configuration is added that a release sheet 33 is stacked for running on a surface of the fiber sheet CS on which the resin transfer sheet RS is not stacked in the stacked fiber sheet CS and resin transfer sheet RS running through the transfer heating treatment portion 3 and the transfer cooling treatment portion 4.

The opening treatment portion 5 to be added to the fiber sheet supply portion 1 only needs to be a device having a mechanism of expanding each fiber bundle in a width direction with favorable fiber dispersibility. For example, it can be a roll opening device for opening by causing each fiber bundle to run in contact with the roll by a mechanism in which a plurality of rolls vibrating in a width direction are arranged in a staggered manner or an air opening device having a mechanism for opening by deflecting each fiber bundle parabolically by causing a fluid to act on it.

Figure 10:
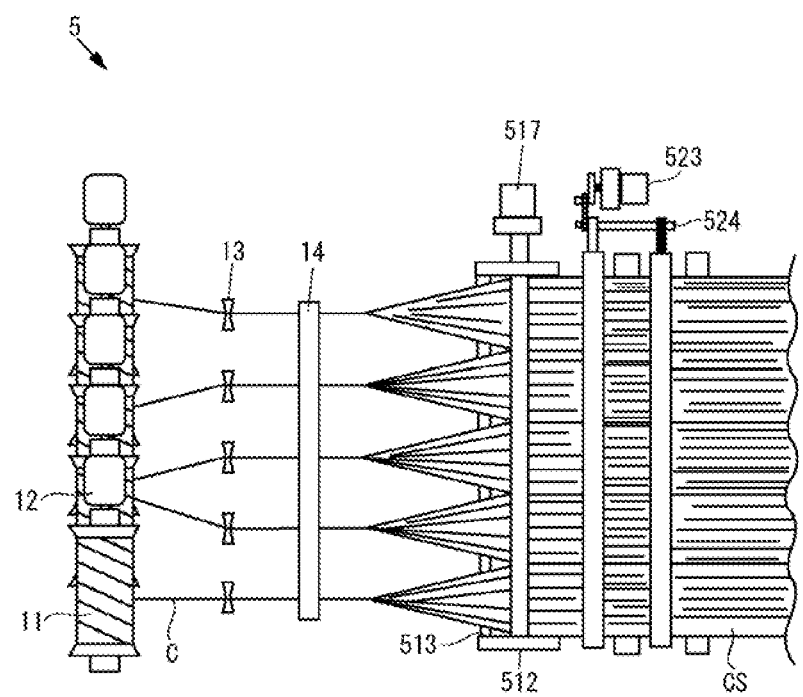
FIG. 10 is an outline plan view related to an opening treatment portion.
Figure 11:
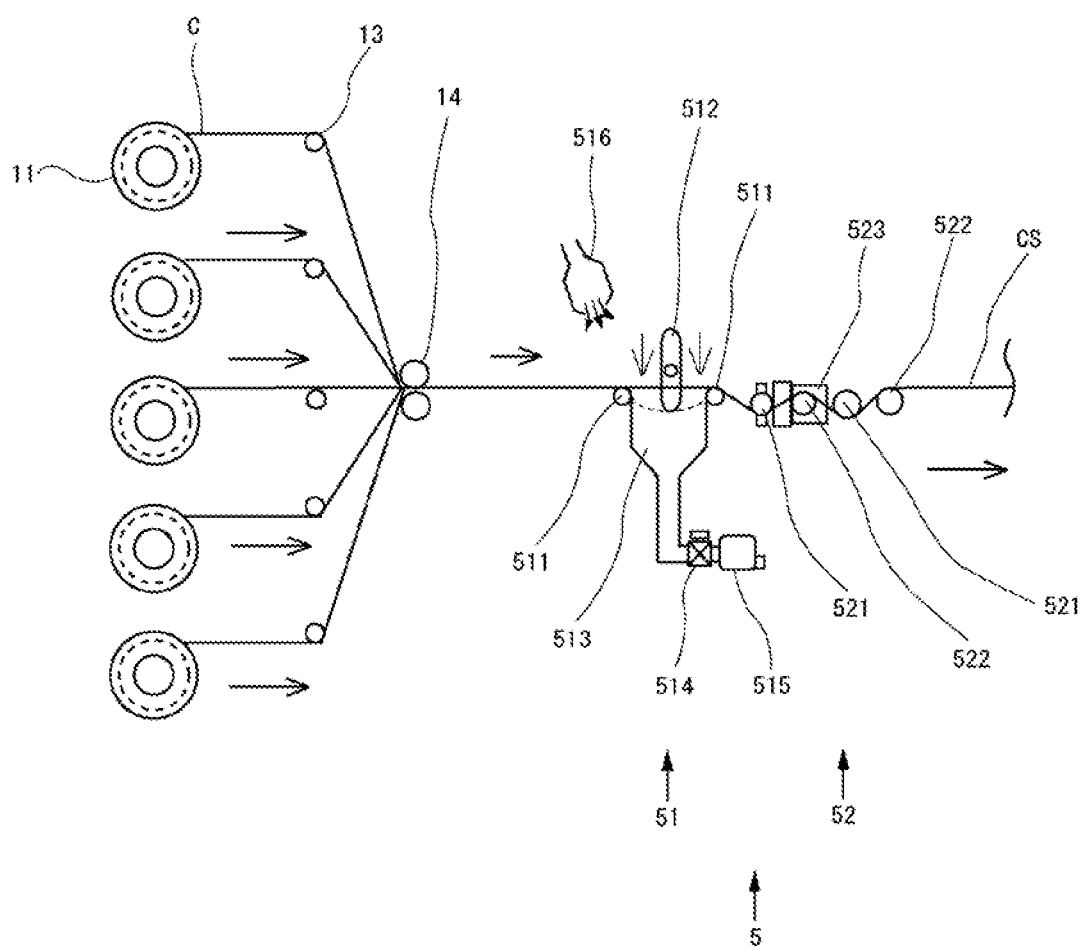
FIG. 11 is an outline side view related to the opening treatment portion.

A device example in FIG. 3 is an opening device example in which the air opening device and the roll opening device are combined. FIGS. 10 and 11 illustrate a plan view and a side view of the opening treatment portion 5 of the opening device.

The opening treatment portion 5 in FIGS. 10 and 11 are configured by an air opening treatment portion 51 which is the air opening device and a lateral vibration opening treatment portion 52 which is a roll opening treatment device.

A fiber bundle C collecting a plurality of fibers are wound around a bobbin-style paper feeder 11, and the fiber bundle C is fed out by rotation of the paper feeder 11. The rotation of the paper feeder 11 is controlled by a driving motor 12 so that the fiber bundle C is fed out with a predetermined tension. A tension measuring device, not shown, and a control device for controlling the rotation of the driving motor 12 in accordance with the tension are configured so that the fiber bundle C has a predetermined tension. The fiber bundle C fed out of the paper feeder 11 is pulled out toward a predetermined pulling-out direction by a width position guide roll 13 and a height position guide roll 14. Since the width position guide rolls 13 are installed at a certain interval in accordance with an opening width of the fiber bundle C, the plurality of fiber bundles C having passed through the height position guide roll 14 run on the same plane at a certain interval.

The pulled-out plurality of fiber bundles C pass through the air opening treatment portion 51 arranged on a running path. The air opening treatment portion 51 supports the fiber bundle C by a pair of guide rolls 511 aligned in the running direction. A wind tunnel pipe 513 is provided between the guide rolls 511, and an upper opening portion of the wind tunnel pipe 513 is formed with a predetermined width between the guide rolls 511. On a lower side of the wind tunnel pipe 513, a flow control valve 514 and an intake pump 515 are mounted. By operating the intake pump 515 so as to suction the air in the wind tunnel pipe 513, a descending air flow by the suctioning is generated in the upper opening portion between the guide rolls 511. Then, a flow rate of the descending air flow can be adjusted by the flow control valve 514.

A deflection forming member 512 is installed at the upper opening portion of the wind tunnel pipe 513. The deflection forming member 512 is set with a length capable of contact with the entire width of the plurality of fiber bundles C and is a plate-shaped body having a predetermined thickness. Support shafts are projected on both side portions in the longitudinal direction, and one of the support shafts is connected/fixed to a rotation driving motor 517, while the other is pivotally supported rotatably on a side wall, not shown, in a mechanism. A pair of curved-shaped contact surfaces is formed on side portions on both side ends of the plate-shaped body set in parallel at a predetermined interval from a center axis connecting the support shafts of the plate-shaped body.

By rotating/driving the rotation driving motor 517, the deflection forming member 512 is rotationally moved between the guide rolls 511 around the support shafts. When the contact surface on both of the side ends of the rotationally moving deflection forming member 512 is brought into contact with the fiber bundle C, the fiber bundle C is pressed into the wind tunnel pipe 513, and when the deflection forming member 512 is further rotationally moved, and the contact surface is rotationally moved upward and is separated from the fiber bundle C. When the contact surface of the deflection forming member 512 is separated from the fiber bundle C, the fiber bundle C is opened in the width direction in the wind tunnel pipe 513 by an action of the descending air flow while deflecting parabolically. By rotationally moving the contact surface of the deflection forming member 512 at a speed higher than the running speed of the fiber bundle C, the fiber bundle C is subjected to pressing-in and deflection alternately in the wind tunnel pipe 513, and the fiber bundle C is opened continuously by the action of the deflection and the descending air flow.

A hot air blower 516 for heating the fiber bundle C by blowing hot air is provided on an upstream side in the running direction of the wind tunnel pipe 513. By heating the fiber bundle to be opened, a sizing agent adhering to the fiber bundle can be softened. Thus, the fibers are disentangled easily, and the fibers are dispersed uniformly at the opening treatment in the wind tunnel pipe 513.

Moreover, when the fiber bundle is to be opened widely, by employing a method of arranging a plurality of sets of this mechanism in the running direction at a certain interval and gradually opening the fiber bundle widely instead of using one set of this mechanism as illustrated in the figure in which the deflection forming member 512 is combined with the wind tunnel pipe 513, the working speed is made higher, and the fiber bundle can be opened widely with favorable dispersibility of the fibers.

The lateral vibration opening treatment portion 52 which is in sliding contact with the plurality of opened fiber bundles in the width direction is provided on the downstream side in the running direction of the air opening treatment portion 51. The lateral vibration opening treatment portion 52 has a pair of rotating rolls 521 aligned over the entire width on an upper side of the opened fiber bundle and a supporting roll 522 on a lower side of the opened fiber bundle. The rotating rolls 521 are connected to a crank mechanism 524, and by driving the crank mechanism 524 by a crank motor 523, the rotating rolls 521 are moved forward/backward in the width direction of the opened fiber bundle. Since the rotating rolls 521 are moved forward/backward and brought into sliding contact with the fibers of the opened fiber bundle, a portion in which the fibers adhere to each other are disentangled, and the fiber sheet CS in which the fibers are more uniformly dispersed with respect to the plurality of opened fiber bundles can be obtained.

By having the configuration in which the opening treatment portion 5 is added to the fiber sheet supply portion 1, the fiber sheet CS in which the plurality of fiber bundles C are aligned in the width direction for running can be brought into a state in which each of the fiber bundles is expanded in the width direction and made thin and has favorable fiber dispersibility, and the fiber base weight of the composite sheet FS can be freely controlled. Particularly, the opening treatment portion 5 configured by the air opening treatment portion 51 and the lateral vibration opening treatment portion 52 described in this embodiment is capable of the opening treatment of the fiber bundle at a high speed and moreover, and an extremely wide and thin opening treatment can be performed even for a fiber bundle with a thick fineness having an extremely large number of fibers.

By using the aforementioned opening treatment portion, opened fibers (opened fiber bundle) in a wide and thin state with the base weight of 10 to 80 $g/m^2$ can be made for a carbon fiber bundle, for example. In the case of a carbon fiber bundle 12K (single fiber diameter: approximately 7 μm, the number of collected fibers: 12000), when it is opened to a width of 20 mm, the opened fiber bundle with the base weight of approximately 40 $g/m^2$, when it is opened to a width of 40 mm, the opened fiber bundle with the base weight of approximately 20 $g/m^2$, and when it is opened to a width of 50 mm, the opened fiber bundle with the base weight of approximately 16 $g/m^2$ can be obtained. In the case of a carbon fiber bundle 50K (single fiber diameter: approximately 7 μm, the number of collected fibers: 50000), when it is opened to a width of 42 mm, the opened fiber bundle with the base weight of approximately 78 $g/m^2$, and when it is opened to a width of 82 mm, the opened fiber bundle with the base weight of approximately 40 $g/m^2$ can be obtained. By aligning a plurality of fiber bundles in the width direction and by opening them at the same time, the fiber sheet CS configuring the opened fiber sheet in which the plurality of opened fiber bundles are aligned in the width direction can be obtained.

In these opened fiber bundles, the number of single fibers aligned in the thickness direction is considered to be as small as 10 or less on an average. For example, when the carbon fiber bundle 12K is opened to the width of 16 mm with uniform fiber dispersibility, the maximum number of the single fibers aligned in the width direction is considered to be approximately 2286 in calculation with 16 mm/0.007 mm (diameter of the carbon fiber), but since a gap is generated between the aligned single fibers, approximately 1500 to 2000 fibers are considered to be aligned in the width direction. Since 12K indicates that 12000 fibers are collected, approximately 6 to 8 fibers are considered to be aligned in the thickness direction. Similarly, when the carbon fiber bundle 12K is opened to the width of 20 mm, approximately 2000 to 2500 fibers are considered to be aligned in the width direction and approximately 4 to 6 in the thickness direction, and in the case of opening to the width of 40 mm, approximately 5000 to 5500 fibers are considered to be aligned in the width direction and approximately 2 to 3 in the thickness direction. Furthermore, when the carbon fiber bundle 50K is opened to the width of 42 mm, approximately 8 to 10 fibers are considered to be aligned in the thickness direction.

As described above, the number of fibers aligned in the thickness direction of the fiber bundle can be made smaller by setting the fiber base weight to 10 to 80 g/m². By causing the thermosetting resin material R to adhere to the one side of such fiber sheet CS so as to manufacture the thermosetting resin prepreg sheet, impregnation of the thermosetting resin material into the fiber bundle is performed smoothly in a short time in a favorable fiber dispersibility state.

Moreover, by setting the fiber base weight to 10 to 80 g/m², the thickness of the manufactured thermosetting resin prepreg sheet can be made as thin as 0.02 to 0.08 mm, and by laminating the thin layered thermosetting resin prepreg sheets, the laminated molded product with excellent dynamic characteristics can be obtained.

The carrying portion 6 added to the resin transfer sheet supply portion 2 has a mechanism of continuously applying the thermosetting resin material R to the transfer sheet TS with a certain thickness. In this embodiment, the carrying portion 6 is a reverse-type applying device including a comma roll 61, a doctor edge 62 on a lower part of the comma roll 61, an applying roll 63 arranged below the comma roll 61, a liquid reservoir member 64 arranged on one side portion of the applying roll 63, and a backup roll 65 arranged on the other side portion of the applying roll 63.

The comma roll 61 is formed having a comma-shaped section by forming the doctor edge 62 along the width direction on a lower part of the metal roll. The comma roll 61 is supported horizontally by a frame, not shown, and is fixed so that it is not rotated while the applying device is operated. The applying roll 63 is a metal driving roll supported by the frame, not shown, and is rotated correspondingly to the running speed by a driving motor, not shown.

By moving the comma roll 61 vertically, a gap between the doctor edge 62 of the comma roll 61 and the applying roll 63 can be adjusted, and the thermosetting resin material R in an amount according to the gap is applied to the surface of the applying roll 63. Then, the narrower the gap becomes, the smaller the amount of the thermosetting resin material R to be applied to the surface of the applying roll 63 becomes.

The liquid reservoir member 64 is for supplying the thermosetting resin material R to the application gap, and the liquid reservoir member 64 is arranged in a diagonal direction from one side portion of the applying roll 63 and stores the thermosetting resin material R between itself and the applying roll 63 in a dam state. The liquid reservoir member 64 is heating-controlled in order to adjust the viscosity of the thermosetting resin material R. Though not shown, both side plates for storing the thermosetting resin material R are provided on the liquid reservoir member 64 and they can regulate an application width to the applying roll 63.

The backup roll 65 is a rotatable roll made of metal or rubber which conveys the transfer sheet TS, brings the transfer sheet TS into contact with the surface of the applying roll 63, and applies the thermosetting resin material R applied by the comma roll 61 to the surface of the transfer sheet TS. The backup roll 65 is supported horizontally by a frame, not shown. The backup roll 65 may be a mechanism actively rotated/driven by a driving motor, not shown, or may be a rotatable mechanism following the running of the transfer sheet TS. If the backup roll 65 is a mechanism actively rotated by the driving motor, the rotating speed is controlled in relation with the rotating speed of the heating roll 31 of the transfer heating treatment portion 3 to such a speed that does not generate excessive tension or sagging on the transfer sheet TS.

The thermosetting resin material R is applied to the surface of the applying roll 63 by the doctor edge 62 of the comma roll 61, the thermosetting resin material R applied to the surface of this applying roll 63 is applied to the surface of the transfer sheet TS conveyed by the backup roll 65, the transfer sheet TS is made to carry the thermosetting resin material R, and the resin transfer sheet RS is obtained. This method is called comma reverse coat. At this time, if the rotating speed of the applying roll 63 is slower than the running speed of the transfer sheet TS, the thermosetting resin amount R applied to the surface of the applying roll 63 is applied to the transfer sheet TS while being spread and thus, the applying amount, that is, the applying thickness can be further thinned, and the thermosetting resin R can be carried on the transfer sheet TS.

The thermosetting resin R may be carried on the transfer sheet TS by other methods. For example, the transfer sheet is supplied along the applying roll, and while the thermosetting resin material is stored in a dam state between the comma roll and the transfer sheet, the amount adjusted by the gap between the doctor edge of the comma roll and the transfer sheet can be carried on the transfer sheet. This method is called comma direct coat. Moreover, such a method may be employed that the thermosetting resin material is stored in a container, a drive roll is immersed therein, the thermosetting resin material is applied so as to be pumped up onto the surface of the drive roll by rotating the drive roll, and the transfer sheet is pressed onto an upper part of the drive roll so that the thermosetting resin material applied to the drive roll surface is applied to the transfer sheet and made to be carried thereon. This method is called kiss coat.

The base weight of the thermosetting resin material carried on the transfer sheet is determined by the thickness of the thermosetting resin prepreg sheet to be manufactured, a volume fraction of fiber (Vf) and the like. In the present invention, the thermosetting resin prepreg sheet can be manufactured at a high speed and in a state with excellent fiber dispersibility by reducing the base weight of the fiber sheet CS configuring the composite sheet FS. Thus, the base weight of the thermosetting resin material made to adhere to the fiber sheet CS also needs to be made smaller.

When the thermosetting resin prepreg sheet using a carbon fiber bundle for the fiber bundle and an epoxy resin for the thermosetting resin material is to be manufactured, by setting the base weight of the fiber sheet of the composite sheet FS to 10 to 80 g/m² and the volume fraction of fiber of the obtained thermosetting resin prepreg sheet within a range from 50 to 60%, the base weight of the thermosetting resin material is within a range from approximately 4.4 to 53.3 g/m². When the thermosetting resin material is uniformly applied to the transfer sheet, according to the experiments by the inventors and the like, the minimum base weight that can be applied was approximately 10 g/m². Thus, the base weight of the thermosetting resin material applied to and carried on the transfer sheet in order to obtain the composite sheet FS is preferably within a range from 10 to 55 g/m².

In the method in which the thermosetting resin material is transferred to and made to adhere to the one surface of the fiber sheet CS while the thermosetting resin material R is carried on the transfer sheet TS as in this embodiment, the process of having the thermosetting resin material carried on the transfer sheet and the process of having the thermosetting resin material transferred to the fiber sheet so as to manufacture the composite sheet are performed at the same time and thus, the processes are shortened, which has an effect of reducing a molding cost.

When the application amount of the thermosetting resin material R applied to the transfer sheet TS is small, if the adhesion to the fiber sheet CS is not sufficient, at peeling of the transfer sheet TS off the composite sheet FS after passing through the transfer cooling treatment portion 4, the thermosetting resin material R is likely to partially remain on the transfer sheet TS. Thus, in the present invention, the method is so configured that the stacked fiber sheet CS and resin transfer sheet RS are heated or heated/pressurized so as to make the fiber sheet and the thermosetting resin material adhere to each other sufficiently, and when the thermosetting resin material is brought into a solid state by cooling or cooling and pressurizing and becomes difficult to be torn off, the transfer sheet TS is peeled off the composite sheet FS.

The thermosetting resin prepreg sheet made with the fiber base weight of 10 to 80 g/m² and the thermosetting resin material at 10 to 55 g/m² becomes a thin layer of the prepreg sheet with the thickness of approximately 0.02 to 0.08 mm. In the case of the thin layer of the prepreg sheet with one-direction reinforcement in which the fibers are aligned in one direction, it is easily torn in the fiber direction, and handling as a sheet is difficult in a state peeled off the release paper. However, the composite sheet FS in which the thermosetting resin material R is made to adhere to the fiber sheet CS, since the thermosetting resin material R adheres to the one surface of the fiber sheet in a layered state, a resin layer in the solid state is formed, and tearing in the fiber direction does not occur easily by the effect of this resin layer. Thus, even the composite sheet FS with low base weights of the fibers and the resin can be handled in the state where the transfer sheet TS has been peeled, and the sheet form can be maintained even if the tension is applied.

In the embodiment in FIG. 3, the fiber sheet CS with a low base weight in which each of the fiber bundles is opened is stacked on the resin transfer sheet RS obtained by having the thermosetting resin material R carried on the transfer sheet TS, it is supplied to the transfer heating treatment portion 3 and made to run and after that, it is made to run through the transfer cooling treatment portion 4 so as to obtain the composite sheet FS. When the fiber sheet CS is stacked on the resin transfer sheet RS and at the same time, the release sheet 33 is stacked on the surface opposite to the one surface of the fiber sheet CS on which the resin transfer sheet RS is stacked and it is made to run and after running through the transfer cooling treatment portion 4, it is peeled off the composite sheet FS and taken up by the bobbin.

The thermosetting resin material R of the resin transfer sheet RS is stacked on the one surface of the fiber sheet CS and transferred thereto and is formed in a layered state on the one surface of the fiber sheet CS and adheres thereto. Thus, the thermosetting resin material R hardly penetrates or oozes out to the opposite surface of the fiber sheet CS, but the thermosetting resin material R can ooze out from the gaps among the fibers in some cases. In such a case, by stacking the release sheet 33 along the fiber sheet CS and by making it run, such a trouble that the oozed out thermosetting resin material adheres to the heating roll 31 and causes the fiber to be wound around the heating roll can be avoided.

The release sheet can be any material as long as it has release characteristics from the thermosetting resin material R. For example, a synthetic resin-based film, paper, a metal sheet and the like can be included. If the sheet itself has the release characteristics from the thermosetting resin material R, it can be used as it is. Moreover, if it does not have the release characteristics from the thermosetting resin material R, the release treatment is applied to the one surface of the release sheet. The release treatment can be executed by a silicone resin-based releasing agent, an alkyd resin-based releasing agent, a long-chain alkyl-based compound releasing agent, a fluorine-based releasing agent, a polyimide-based releasing agent and the like in some cases, and a resin film having the release characteristics from the thermosetting resin material R such as polyester, polyethylene, and polypropylene is bonded and subjected to a lamination treatment in other cases.

In the transfer heating treatment portion 3 and the transfer cooling treatment portion 4, when the stacked fiber sheet CS and resin transfer sheet RS run, pressurizing may be performed so as to have the thermosetting resin material R adhere to the one surface of the fiber sheet CS. The embodiment in FIG. 3 is configured such that the pressurizing roll 31 and the pressurizing roll 42 are installed for the heating roll 31 and the cooling roll 41, respectively, and the stacked fiber sheet CS and resin transfer sheet RS are pressurized. According to the experiments by the inventors and the like, the pressurizing force is preferably within a range from 5 to 20 kgf/cm by linear pressure. Moreover, a linear pressure within a range from 5 to 10 kgf/cm is more preferable. When the pressurizing force is 20 kgf/cm or more, the thermosetting resin material in a highly viscos state is pressed into the fiber sheet CS with a large force and thus, orientation of the fibers configuring the fiber sheet can be disturbed in some cases. Moreover, since the large pressurizing force is applied to the transfer sheet and the release sheet, deterioration or damage occurs, and the number of times of repeated use is decreased.

Moreover, when the stacked fiber sheet CS and resin transfer sheet RS are heated, a method of pressurizing includes a method of bringing the heating roll 31 and the cooling roll 41 into contact with each other with pressure. It may be so configured that when the viscosity of the heated thermosetting resin material is lowered by pressing and pressurizing the cooling roll 41 to the heating roll 31, the thermosetting resin material is pressed and bonded into the fiber sheet. The linear pressure at this time is preferably within a range from 5 to 20 kgf/cm or more preferable within a range from 5 to 10 kgf/cm.

Figure 4:
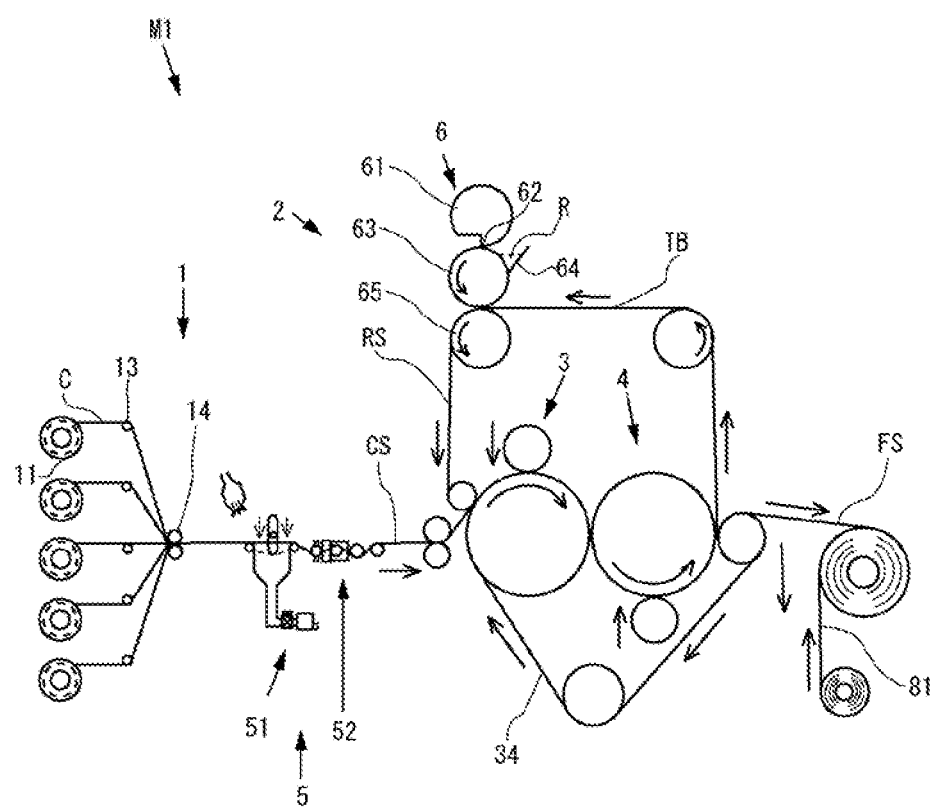
FIG. 4 is an outline side view related to still another molding device for the composite sheet according to the present invention.

FIG. 4 is an outline side view related to another molding device for a composite sheet according to the present invention. The another molding device for the composite sheet in FIG. 4 has configuration that a transfer sheet formed in an endless state, that is, a continuous belt-shaped transfer sheet is used in the molding device for the composite sheet in FIG. 3. The endless transfer sheet can be called a transfer belt TB. Moreover, an endless release sheet, that is, a release belt 34 is configured instead of the release sheet 33 used in the FIG. 3.

The endless transfer sheet, that is, the transfer belt TB is a resin belt or a metal belt as a material and is a belt having such release characteristics that the thermosetting resin material can be applied to one surface thereof without being repelled and when the applied thermosetting resin material is to be transferred to the fiber sheet, the thermosetting resin material does not remain on the sheet surface.

The resin belts include the one obtained by coating a glass cloth, an aramid cloth or the like with a fluorine resin and by bonding both ends in a longitudinal direction so as to have a belt shape, the one obtained by coating a polyester canvas with silicone rubber and by bonding both of the ends in the longitudinal direction to have a belt shape, a polyimide belt by a thermosetting polyimide resin and the like.

When the aforementioned transfer belt TB itself has the release characteristics from the thermosetting resin material R, it can be used as it is. When it does not have the release characteristics from the thermosetting resin material R, the release treatment is applied to the surface of the transfer belt TB to which the thermosetting resin material is applied. The release treatment is executed by a silicone resin-based releasing agent, an alkyd resin-based releasing agent, a long-chain alkyl-based compound releasing agent, a fluorine-based releasing agent, a polyimide-based releasing agent and the like.

In the device in FIG. 4, the transfer belt TB has its surface applied with the thermosetting resin material R in the carrying portion 6, becomes the resin transfer sheet RS and is stacked on the one surface of the fiber sheet CS. The stacked resin transfer sheet RS and fiber sheet CS run through the transfer heating treatment portion 3 and the transfer cooling treatment portion 4, and the thermosetting resin material R carried on the transfer belt TB is transferred to and made to adhere to the fiber sheet CS and is molded into the composite sheet FS. After running through the transfer cooling treatment portion 4, the transfer belt TB stacked on the one surface of the composite sheet FS is peeled off. As the result of transfer of the thermosetting resin material R to the fiber sheet CS, the surface of the transfer belt TB subjected to the release treatment is exposed without remaining of the thermosetting resin material R and is supplied to the carrying portion 6 again.

The release belt 34 is stacked on the one surface of the fiber sheet CS on which the resin transfer sheet is not stacked in the stacked resin transfer sheet RS and fiber sheet CS and run through the transfer heating treatment portion 3 and the transfer cooling treatment portion 4. After the running through the transfer cooling treatment portion 4, the release belt 34 is peeled off the composite sheet FS and is supplied to the transfer heating treatment portion 3 again.

The endless transfer sheet, that is, the transfer belt can be used because, when the thermosetting resin material R applied to the transfer belt is transferred to and made to adhere to the fiber sheet CS, since the heating temperature is low in the transfer heating treatment portion 3 and the transfer cooling treatment portion 4, and the pressurizing force is small, deterioration or damage caused by heating and pressurization can hardly occur in the transfer belt, and repeated use is made possible.

By using the endless transfer sheet, that is, the transfer belt TB and the endless release sheet, that is, the release belt 34, the composite sheet FS having an equal length to the fiber bundle length can be molded without being influenced by lengths of subsidiary materials such as the transfer sheet and the release sheet. Since this reduces the use amount of the subsidiary materials, the cost for the subsidiary materials can be also reduced. Moreover, since a labor for replacing the subsidiary material or the like is not needed, the molding cost can be also reduced.

Figure 5:
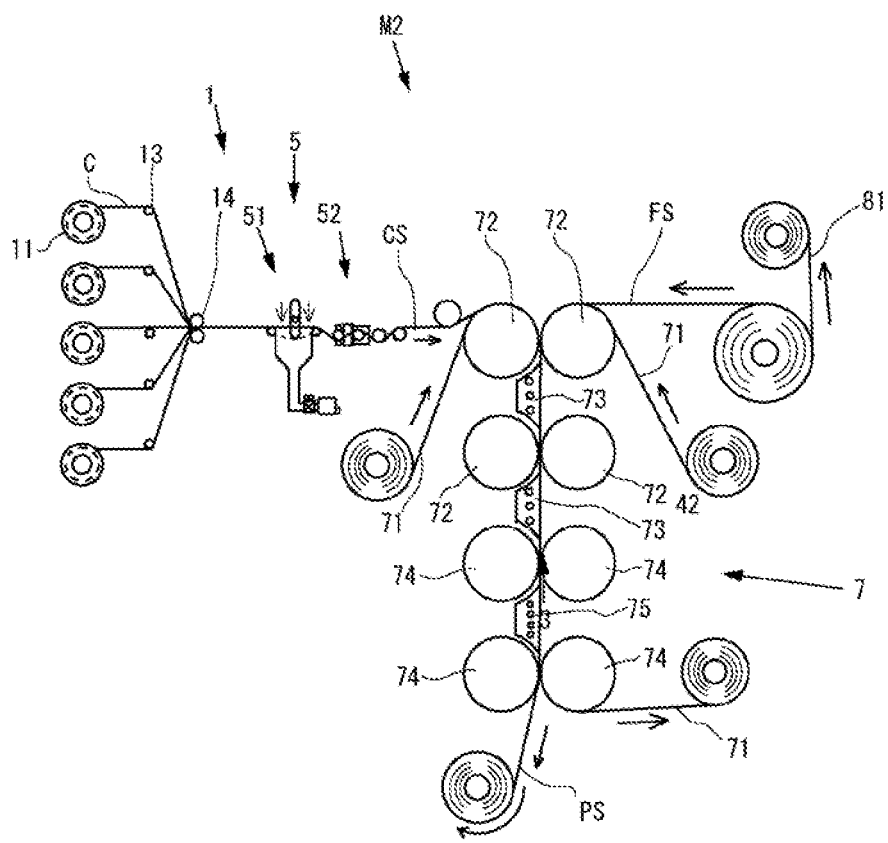
FIG. 5 is an outline side view related to a manufacturing device for a thermosetting resin prepreg sheet using the composite sheet according to the present invention.

FIG. 5 is an outline side view related to a manufacturing device for a thermosetting resin prepreg sheet using the composite sheet according to the present invention. A manufacturing device M2 of the thermosetting resin prepreg sheet in FIG. 5 includes the fiber sheet supply portion 1 incorporating the opening treatment portion 5 and an impregnation treatment portion 7 and is a device example configured such that the composite sheet FS taken up by the bobbin is stacked on the fiber sheet CS supplied from the fiber sheet supply portion 1 and continuously supplied to the impregnation treatment portion 7, the thermosetting resin material R is impregnated into the fiber bundle C configuring the fiber sheet CS in the impregnation treatment portion 7 so as to manufacture a thermosetting resin prepreg sheet PS.

The fiber sheet supply portion 1 has a mechanism similar to the fiber sheet supply portion 1 of the molding device M1 of the composite sheet in Figured 3 and 4. The plurality of fiber bundles C are subjected to the opening treatment so as to obtain the fiber sheet CS with a low base weight and it is supplied to the impregnation treatment portion 7. Since in the fiber sheet CS, each of the fiber bundles is subjected to the opening treatment, it has the base weight of 10 to 80 $g/m^2$ but since the fiber base weight is determined by the thermosetting resin prepreg sheet to be manufactured, the base weight of the fiber sheet CS is determined in relation with the configuration of the composite sheet FS.

The composite sheet FS wound out of the bobbin is supplied to the impregnation treatment portion 7. At this time, since the cover film 81 is stacked on the one surface of the composite sheet FS, only the composite sheet FS is supplied to the impregnation treatment portion 7 while taking up the cover film 81 by a taking-up device, not shown. Then, the one surface of the composite sheet FS to which the thermosetting resin material adheres is stacked on the supplied fiber sheet CS and supplied to the impregnation treatment portion 7.

As a device example of the impregnation treatment portion 7 in the present invention, the viscosity of the thermosetting resin material R is lowered by being passed through a pair of heating and pressurizing rolls 72 and a heating plate 73 and further the pair of the heating and pressurizing rolls 72 and the heating plate 73, and the thermosetting resin material R is impregnated into the fiber bundle C. After that, the thermosetting resin material R having been continuously passed through a cooling and pressurizing roll 74, a cooling plate 75 and the cooling and pressurizing roll 74 and having been heated is cooled so as to manufacture the thermosetting resin prepreg sheet PS. In the device example in FIG. 5, the release sheets 71 wound around the bobbins are wound out with a certain tension and supplied from right and left to between the pair of heating and pressurizing rolls located on the uppermost side in the running direction so that the release sheet 71 is heated/pressurized through each of the heating and pressurizing rolls 72. Then, after the release sheet 71 on the right side has passed through the pair of cooling and pressurizing rolls 74 located on the lowermost side in the running direction, it is peeled off the thermosetting resin prepreg sheet PS by a taking-up device, not shown, and taken up by the bobbin. The release sheet 71 on the left side is stacked as a separation sheet on the one surface of the thermosetting resin prepreg sheet PS to be manufactured and is taken up by the bobbin. This device example M1 is configured by 2 sets of the pair of heating and pressurizing rolls 72, two pieces of the heating plates, 2 sets of the pair of cooling and pressurizing rolls, and one piece of the cooling plate 75, but the numbers of installed components are increased or decreased in accordance with a manufacturing speed of the thermosetting resin prepreg sheet to be manufactured.

When the composite sheet FS wound around the bobbin is wound out with a certain tension while removing the cover film and is supplied to the impregnation treatment portion 7, a certain tension is applied to the composite sheet FS. At this time, when the thermosetting resin material R adheres in the solid state to the one surface of the fiber sheet CS configuring the composite sheet FS or preferably adheres to the whole surface of the one surface of the fiber sheet CS, even if the tension is applied to the composite sheet FS, wrinkles or width shrinkage and the like can be prevented. If the fiber sheet CS adheres to the thermosetting resin material R partially, that is, if there is a portion where the fiber sheet CS does not adhere to the thermosetting resin material R or if a degree of adhesion is weak, that is, if there is a portion where the fiber sheet CS is separated from the thermosetting resin material R in the solid state when the tension is applied to the composite sheet FS, wrinkles or width shrinkage and the like occurs when the tension is applied to the composite sheet FS, and stable supply to the impregnation treatment portion 7 can no longer be performed.

The one surface of the composite sheet FS to which the thermosetting resin material adheres is stacked on the fiber sheet CS to be supplied and supplied, and in a state where the composite sheet FS and the fiber sheet CS are sandwiched by the release sheet 71, it is supplied so as to be sandwiched by the pair of heating and pressurizing rolls 72 of the impregnation treatment portion 7. The heating temperature of the heating and pressurizing roll 72 and the heating plate 73 is set so that the thermosetting resin material R has the viscosity impregnated into the fiber sheet CS. The heating temperature is preferably set so that, when the viscosity of the thermosetting resin material R is within a range from 1 to 10 Pa·s, the thermosetting resin material receives the pressurizing force by the heating and pressurizing roll at least once or more and can be impregnated into the fiber bundle.

Moreover, the linear pressure of the heating and pressurizing roll to be set is preferably within a range from 10 to 30 kgf/cm according to the experiments by the inventors and the like. Moreover, a range of the linear pressure from 20 to 25 kgf/cm is more preferable. If the pressurizing force is 10 kgf/cm or less, a portion where the thermosetting resin material is not impregnated into the fiber bundle can be generated easily, while if the pressurizing force is 30 kgf/cm or more, the thermosetting resin material protrudes from an end portion in the width direction of the prepreg sheet or the fibers meanders easily.

For the release sheet 71, a material similar to that of the release sheet 33 used in the device example in FIG. 3 may be used.

Figure 6:
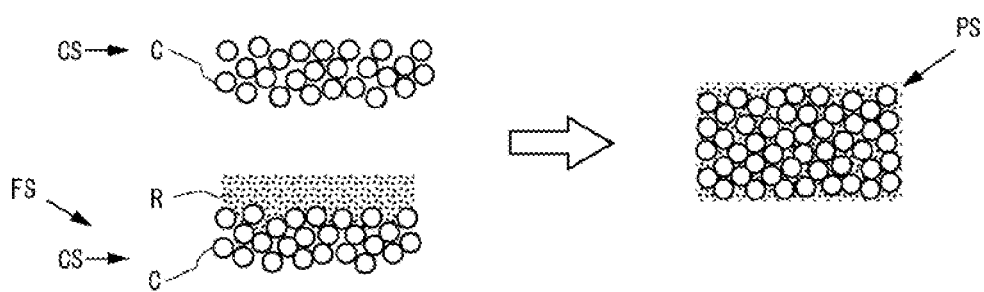
FIG. 6 is an explanatory view related to a manufacturing method for the thermosetting resin prepreg sheet using the composite sheet according to the present invention.

FIG. 6 is an explanatory view related to the manufacturing method for the thermosetting resin prepreg sheet using the composite sheet according to the present invention. It includes a sectional schematic view when the fiber sheet CS is stacked on an adhesion surface of the thermosetting resin material R in the composite sheet FS and a sectional schematic view when the thermosetting resin material is impregnated into the fiber bundle so as to have the thermosetting resin prepreg sheet.

The conventional manufacturing method for the thermosetting resin prepreg sheet is a method in which the thermosetting resin material is impregnated from both surfaces or one surface of the fiber sheet, but in the manufacturing method using the composite sheet FS in the present invention, the fiber sheet can be stacked on both surfaces with the thermosetting resin material at the center and subjected to heating and pressurizing, and the thermosetting resin material arranged at the center is impregnated into the fiber sheet and is moved outward. In such a method, a distance of the thermosetting resin material flowing in the fiber bundle can be shortened, and the flow becomes symmetric in the thickness direction and thus, the prepreg sheet excellent in fiber dispersibility can be manufactured. Moreover, since voids in the fiber bundles can escape to both of the surfaces easily, voids can be hardly generated in this manufacturing method. That is, the high-quality thermosetting resin prepreg sheet can be manufactured at a high speed. Moreover, since the resin impregnation of the thermosetting resin material R into the fiber bundle can be performed easily, the pressurizing force can be suppressed in the heating and pressurizing, and damage on the release sheet 71 can be also suppressed. Thus, the number of times of repeated use of the release sheet 71 is increased, and an effect that the cost of the subsidiary material can be reduced can be also obtained.

Figure 7:
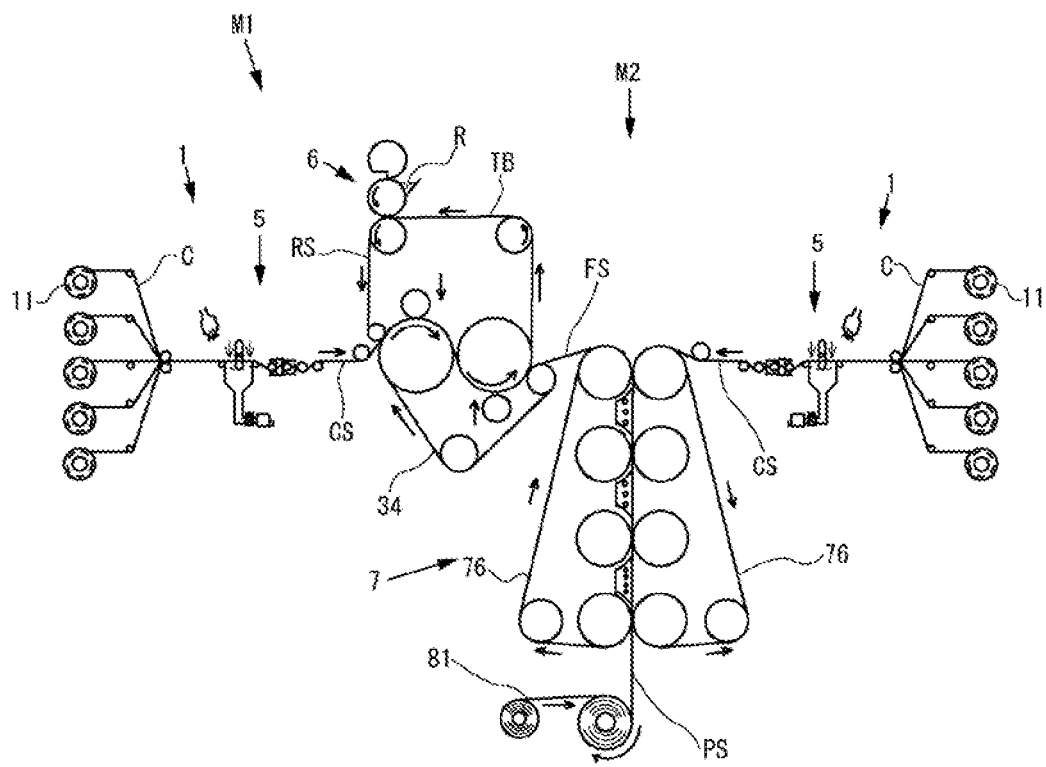
FIG. 7 is an outline side view related to the manufacturing device for the thermosetting resin prepreg sheet in which the molding device for the composite sheet according to the present invention is incorporated.

FIG. 7 is an outline side view related to the manufacturing device for the thermosetting resin prepreg sheet incorporating the molding device for the composite sheet according to the present invention. FIG. 7 is an outline side view of the manufacturing device M2 of the thermosetting resin prepreg sheet having a mechanism portion for supplying the composite sheet FS wound around the bobbin removed from and the manufacturing device M1 of the composite sheet incorporated in the manufacturing device for the thermosetting resin prepreg sheet in FIG. 6.

The manufacturing device M2 of the thermosetting resin prepreg sheet in FIG. 7 includes the fiber sheet supply portion 1 incorporating the opening treatment portion 5, the manufacturing device M2 of the composite sheet and the impregnation treatment portion 7, and it is a device example in which, while the composite sheet FS in which the thermosetting resin material R is made to adhere to the one surface of the fiber sheet CS is manufactured, another fiber sheet CS is manufactured and stacked on the thermosetting resin material R side of the composite sheet FS and supplied to the impregnation treatment portion 7, the thermosetting resin material R is impregnated into the fiber sheet CS in the impregnation treatment portion 7 so as to manufacture the thermosetting resin prepreg sheet PS and is stacked on the cover film 81 and is taken up by the bobbin.

In the impregnation treatment portion 7, the device example in FIG. 5 has a mechanism in which the stacked composite sheet FS and fiber sheet CS are sandwiched by the release sheet 71 and is subjected to heating and pressurizing and cooling and pressurizing, but the device example in FIG. 7 has a mechanism in which the stacked composite sheet FS and fiber sheet CS are sandwiched by a release belt 76 and is subjected to heating and pressurizing and cooling and pressurizing.

The release belt 76 includes a resin belt, a metal belt and the like as a material and is a belt having such release characteristics on the surface in contact with the thermosetting resin prepreg sheet PS that the thermosetting resin prepreg sheet PS can be peeled off after the cooling and pressurizing.

The resin belts include the one having a belt shape obtained by coating a glass cloth, an aramid cloth and the like with a fluorine resin and by bonding both of the ends in the longitudinal direction, a belt shape obtained by coating a polyester canvas with silicone rubber and bonding both of the ends in the longitudinal direction, a polyimide belt of a thermosetting polyimide resin and the like.

In the aforementioned release belt 76, if it has the release characteristics from the thermosetting resin prepreg sheet PS, it may be used as it is. If it does not have the release characteristics from the thermosetting resin prepreg sheet PS, the release treatment is applied to the belt surface of the aforementioned material. The release treatment is executed by a silicone resin-based releasing agent, an alkyd resin-based releasing agent, a long-chain alkyl-based compound releasing agent, a fluorine-based releasing agent, a polyimide-based releasing agent and the like.

When the prepreg sheet is to be manufactured by impregnating the thermosetting rein material R into the fiber sheet CS, heating and pressurizing and cooling and pressurizing are performed, but by using the composite sheet FS of the present invention, unlike the method of impregnating the thermosetting resin material from both surfaces of the material in a conventional process, the fiber sheet can be arranged on both surfaces of the thermosetting resin material and can be impregnated, whereby a distance for impregnation of the thermosetting resin material into the fiber bundle is shortened, and a manufacturing method excellent in resin impregnation into the fiber bundle can be obtained. Thus, since the pressurizing force in the heating and pressurizing process and the cooling and pressurizing process can be reduced, damage to the release belt can be suppressed. Thus, the heating and pressurizing and the cooling and pressurizing can be repeatedly applied, and the thermosetting resin prepreg sheet can be manufactured by using the release belt. However, the resin belt and the metal belt to be the release belt is selected by considering damage in the heating and pressurizing and the cooling and pressurizing and a thickness of the belt.

As in FIG. 7, in the manufacturing device M2 of the thermosetting resin prepreg sheet incorporating the molding device M1 of the composite sheet FS, manufacture of the thermosetting resin prepreg sheet by using the transfer belt TB, the release belt 34, and the release belt 76 can eliminate limitation on the length of the release sheet which is a subsidiary material and thus, up to the thermosetting resin prepreg sheet equivalent to the fiber bundle length wound around the bobbin can be manufactured.

The conventional manufacturing method needs labors in two processes in which the resin coating is made to the release sheet and then, the thermosetting resin prepreg sheet is manufactured (when the thermosetting resin is impregnated from both surfaces of the fiber sheet, the process of the resin coating is performed twice and then, the thermosetting resin prepreg sheet is manufactured, which means three processes in total), but in the method of manufacturing the thermosetting resin prepreg sheet while manufacturing the composite sheet FS in the present invention, the thermosetting resin prepreg sheet can be manufactured in one process, which shortens the manufacturing process and reduces the manufacturing cost.

Figure 8:
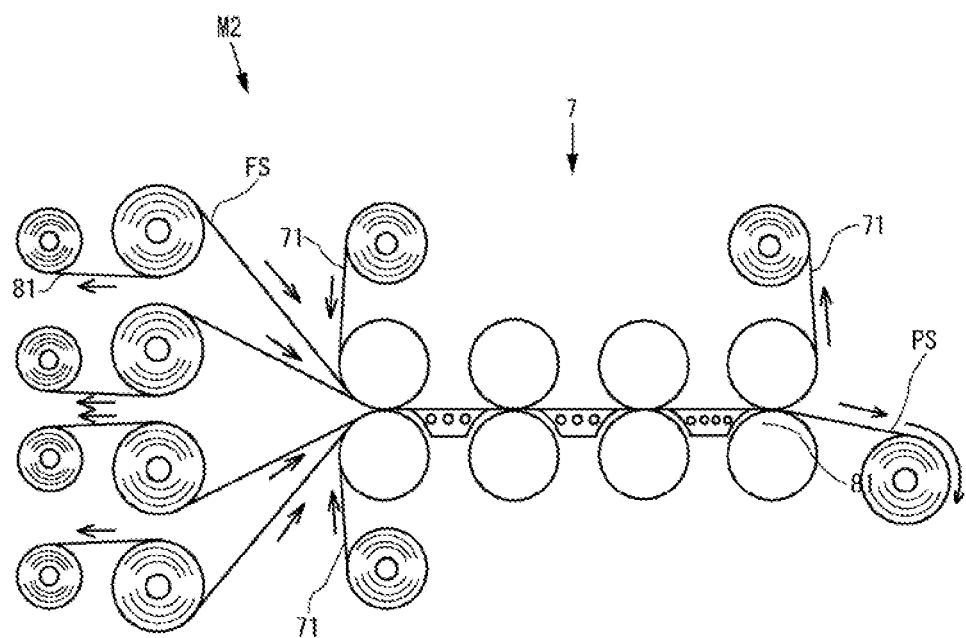
FIG. 8 is an outline side view related to another manufacturing device for the thermosetting resin prepreg sheet using the composite sheet according to the present invention.

FIG. 8 is an outline side view related to another manufacturing device for the thermosetting resin prepreg sheet using the composite sheet according to the present invention. FIG. 8 shows a device example in which a plurality of bobbins around each of which the composite sheet FS is wound are installed in a winding-out device, not shown, a plurality of the composite sheets FS are stacked in the thickness direction and is supplied to the impregnation treatment portion 7 so as to manufacture the thermosetting resin prepreg sheet.

In FIG. 8, a plurality of the bobbins around each of which the composite sheet FS is wound are installed in the winding-out device, not shown, and a brake mechanism, not shown, is mounted on each of the bobbins so that the composite sheet FS can be wound out by applying a certain tension. And a mechanism for winding out the composite sheet FS from each of the bobbins by applying the certain tension and peeling off and taking up the cover film 81 stacked on the composite sheet FS is mounted.

Figure 9:
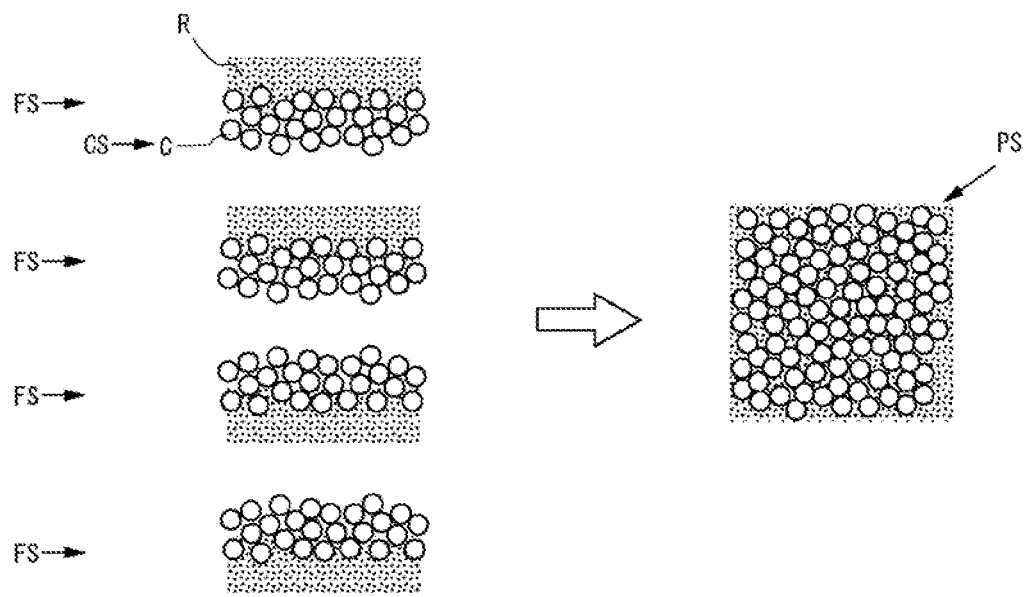
FIG. 9 is an explanatory viewed related to another manufacturing method for the thermosetting resin prepreg sheet using the composite sheet according to the present invention.

FIG. 9 is an explanatory view related to another manufacturing method for the thermosetting resin prepreg sheet using the composite sheet according to the present invention. And an outline of a state in which a plurality of the composite sheets FS are stacked in the thickness direction is illustrated. In FIG. 9, four pieces of the composite sheets FS are stacked in the thickness direction. The composite sheets FS are stacked so that the thermosetting resin material R is arranged on outer sides symmetrically to the center in the thickness direction and wound out.

The four sheets of composite sheets FS are supplied to the impregnation treatment portion 7 in a stacked state and the thermosetting resin material R is impregnated into the fiber sheet CS by going through the processes of the heating and pressurizing and the cooling and pressurizing, and the thermosetting resin prepreg sheet PS is manufactured. By stacking a plurality of the composite sheets FS, a thick layer of the thermosetting resin prepreg sheet with a large fiber base weight can be manufactured.

In the conventional manufacturing method for the thermosetting resin prepreg sheet, the thermosetting resin material is impregnated from both surfaces into the plurality of fiber bundles aligned in the width direction. The thick layer of prepreg sheet can be manufactured by supplying each of the fiber bundles unopened but in a bundled state to the impregnation treatment portion 7, but an impregnation distance of the resin is long and impregnation time takes long and thus, the working speed cannot be expedited. Moreover, since void portions increase, lowered quality is concerned about.

In the present invention, the thermosetting resin material R is arranged at a plurality of spots in the middle of the thickness direction and it can be continuously supplied to the impregnation treatment portion 7 by using the composite sheet FS. As a result, the resin impregnation distance of the thermosetting resin material R into the fiber bundle is shortened, voids are decreased, and the impregnation of the thermosetting resin material R into the fiber bundle can be performed at a high speed.

EXAMPLES

Example 1

The composite sheet FS was molded by using the following materials and subsidiary materials.
<Used Materials>
  (Fiber Bundle C Used for the Fiber Sheet CS)
  Toray Industries, Inc.; T7000SC-12K, Number of fibers: 12000, Fiber base weight: 0.8 g/m
  (Thermosetting Resin Material R)
  Epoxy resin main agent: jER828:jER1001=4:6 (weight ratio) (both main agents are made by Mitsubishi Chemical Corporation)
  Curing agent: dicyandiamide (DICY-7, by Mitsubishi Chemical Corporation)
  Curing accelerator: DCMU (DCMU-99, by Hodogaya Chemical Co., Ltd.)
<Transfer Sheet TS>
  The release paper WBE90R-D (by Lintec Corporation) in which the release treatment was applied to both surfaces was used as a transfer sheet. The width of the release paper is 250 mm, and the length is 500 m.
<Molding of Resin Transfer Sheet RS>
  (1) The epoxy resin main agents jER828 and jER1001 were kneaded at a weight ratio of 4:6 by using a planetary mixer PLM-2 (by INOUE MFG., INC.), and the curing agent and the curing accelerator were added in 8 parts and 3 parts, respectively, to 100 parts of the main agents in a weight ratio and kneaded so as to obtain the epoxy resin. A kneading temperature was 50° C., and resin viscosity was approximately 300 Pa·s.

(2) An epoxy resin made in the process (1) was continuously applied to one surface of the transfer sheet TS with a width of 190 mm and an application weight of 22 g/m² in the comma reverse coat method in a resin coating device R-HC (by HIRANO TECSEED Co., Ltd.) so as to mold the resin transfer sheet RS. The molding conditions were set such that a temperature was set to 60° C. for the comma roll, the applying roll, and the liquid reservoir member, a gap between the doctor edge and the applying roll at 0.02 mm, a speed ratio of the applying roll:the backup roll at 100:120, and the working speed at 10 m/min. The resin viscosity at the temperature of 60° C. was approximately 80 Pa·s. Viscosity measurement of the thermosetting resin material was made by using a dynamic viscoelasticity measuring device (Physica MCR301 by Anton Paar).

<Molding of Composite Sheet FS>

(1) A device such as the molding deice M1 of the composite sheet illustrated in FIG. 1 was used as a molding device for the composite sheet, and a device incorporating the opening treatment portion 5 in the fiber sheet supply portion 1 was used. Specification was such that two sets of the air opening treatment portions 51 and one set of the lateral vibration opening treatment portion 52 were incorporated in the opening treatment portion 5. Moreover, the specification of the mechanism was such that one piece of the heating roll 31 and one piece of the cooling roll 41 were incorporated so that the cooling roll 41 can be pressed/pressurized to the heating roll 31. The release sheet 33 was inserted into the heating roll 31 and the cooling roll 41 as in FIG. 3. The release paper WBE90R-D (by Lintec Corporation) was used for the release sheet.

(2) Five pieces of the carbon fiber bundles were set at an interval of 40 mm in the width direction in the fiber sheet supply portion 1, and one fiber was opened to approximately 40 mm in the opening treatment portion 5 so as to make the fiber sheet CS with the width of 200 mm. The fiber base weight of the fiber sheet CS was approximately 20 g/m².

(3) The fiber sheet CS and the resin transfer sheet RS set in the resin transfer sheet supply portion 2 were stacked and supplied to the heating roll 31 of the transfer heating treatment portion 3. The temperature of the heating roll 31 was set to 55° C. However, since the thermosetting resin material R was heated through the release sheet on the heating roll 31, and the working speed was high, when a surface temperature of the release sheet in contact with the heating roll 31 immediately before transfer from the heating roll 31 to the cooling roll 41 was measured, the temperature was approximately 45° C. At the temperature of 45° C., the viscosity of the thermosetting resin material R is approximately 1000 Pa·s. Then, the cooling roll 41 is pressurized to the heating roll 31 at the linear pressure of 10 kgf/cm.

(4) The stacked fiber sheet CS and resin transfer sheet RS ran through the heating roll 31 and then, run through the cooling roll 41. The cooling roll is water-cooled by water circulating in the roll. The surface temperature of the roll was approximately 15° C. In the cooling roll 41, since the thermosetting resin material R and the fiber sheet CS were cooled through the transfer sheet TS and the working speed was high, when the surface temperature of the transfer sheet TS in contact with the cooling roll 41 immediately before discharge from the cooling roll 41 was measured, the temperature was approximately 25° C. At the temperature of 25° C., the viscosity of the thermosetting resin material R is approximately 10000 Pa·s or more.

(5) The stacked fiber sheet CS and resin transfer sheet RS ran through the cooling roll 41 and then, the release paper which is the transfer sheet TS was peeled off, and the composite sheet FS in which the thermosetting resin material R has transferred to the one surface of the fiber sheet CS was slit on both of the end portions and taken up by the bobbin together with the cover film 81 made of polyethylene. The working speed was 20 m/min.

<Evaluation of Composite Sheet FS>

The composite sheet FS with the width of 180 mm, the fiber base weight of 20 g/m² and the resin base weight of 22 g/m² was continuously molded in a good quality state where fibers were linearly aligned apparently with few gaps among fibers in the fiber sheet CS. Moreover, a state where the thermosetting resin material R is formed on the whole surface of the one surface of the fiber sheet CS could be visually confirmed, and when a sheet state was checked by applying a tension to or deflecting the composite sheet FS, a state where the thermosetting resin material R adhered to the whole one surface of the fiber sheet could be confirmed. The thickness was measured by using a micrometer, and it was approximately 0.05 mm on an average, which is larger than the thickness of approximately 0.03 mm or more at resin impregnation indicated by calculation, and it is considered that the thermosetting resin material R is formed in the layered state on the one surface of the fiber sheet CS in combination with the visual recognition.

Example 2

The thermosetting resin prepreg sheet PS was manufactured by using the composite sheet FS molded in Example 1.

<Manufacturing Method for Thermosetting Resin Prepreg Sheet>

(1) A device as illustrated in FIG. 5 was used as a manufacturing device for the thermosetting resin prepreg sheet. Specification was such that the fiber sheet supply portion 1 incorporates the opening treatment portion 5 in which two sets of the air opening treatment portions 51 and one set of the lateral vibration opening treatment portion 52 were incorporated. Moreover, the specification of the impregnation treatment portion 7 was such that two sets of the pair of the heating and pressurizing rolls 72, two sets of the heating plates 73, two sets of the pair of the cooling and pressurizing rolls 74, and one set of the cooling plate were incorporated. The release paper WBE90R-D (by Lintec Corporation) was used for the release sheet 71.

(2) Five pieces of the carbon fiber bundles were set at an interval of 40 mm in the width direction in the fiber sheet supply portion 1, and one fiber was opened to approximately 40 mm in the opening treatment portion 5 so as to make the fiber sheet CS with the width of 200 mm. The fiber base weight of the fiber sheet CS was approximately 20 g/m².

(3) The bobbin around which the composite sheet FS was wound was set, and the composite sheet FS was wound out while the cover film 81 was removed and was stacked on the fiber sheet CS fed out of the fiber sheet supply portion and supplied to the pair of heating and pressurizing rolls 72. It was supplied such that the surface of the composite sheet FS to which thermosetting resin material adheres was stacked on the fiber sheet CS.

(4) The supplied and stacked fiber sheet and composite sheet FS were sandwiched by the release sheet, ran through the heating and pressurizing roll, the heating plate, the cooling and pressurizing roll, and the cooling plate, and the thermosetting resin material was impregnated into the fiber sheet. The heating and pressurizing roll 72 and the heating plate 73 were set to the temperature of 90° C., and the cooling and pressurizing roll 74 and the cooling plate 75 were cooled by coolant. Moreover, the heating and pressurizing roll and the cooling and pressurizing roll were both set to the linear pressure of 20 kgf/cm. The working was performed by setting the working speed at 20 m/min.

(5) The thermosetting resin prepreg sheet PS in which the thermosetting resin material was impregnated into the fiber sheet ran through the cooling and pressurizing roll 74 and then, the release sheet 71 on the one surface side was peeled off and taken up by the bobbin together with the release sheet on the other surface side.

<Evaluation of Thermosetting Resin Prepreg Sheet>

The thermosetting resin prepreg sheet with the width of 180 mm, the fiber base weight of 40 g/m², and the resin base weight 22 g/m² could be continuously manufactured. The manufactured thermosetting resin prepreg sheet PS was in a state where fibers were linearly aligned apparently with favorable resin impregnation. Moreover, both of the surfaces had sufficient tackiness capable of being laminated in laminated molding in the subsequent process. Moreover, a pseudo isotropic laminated plate [45/0/−45/90] having a thickness of approximately 2 mm in which the manufactured thermosetting resin prepreg sheets were laminated was manufactured by an autoclave molding method, and the laminated plate without a void was molded in sectional observation of the laminated plate. Moreover, a test piece was taken out of the laminated plate and subjected to a tensile test and a compression test and it was found to have strength improved by approximately 5% as compared with the laminated plate molded from the thermosetting resin prepreg sheet with the thickness of 0.12 mm manufactured by the conventional manufacturing method. That is, the effect of opening of the fiber bundle so as to straighten the fibers was considered to be exerted.

Example 3

The thermosetting resin prepreg sheet PS was manufactured by using the composite sheet FS molded in example 1.

<Manufacturing Method for Thermosetting Resin Prepreg Sheet>

(1) A device as illustrated in FIG. 8 was used as a manufacturing device for the thermosetting resin prepreg sheet. The configuration of the impregnation treatment portion 7 is equal to that of the device in Example 2. The release paper WBE90R-D (by Lintec Corporation) was used for the release sheet 71.

(2) Four bobbins each of around which the composite sheet FS was wound was set, and the composite sheet FS was wound out while the cover film 81 was removed and supplied to the pair of heating and pressurizing rolls 72 so that four pieces are stacked on each other. The composite sheets FS were stacked as illustrated in FIG. 9.

(3) The stacked four sheets of the composite sheets FS were sandwiched by the release sheet, ran through the heating and pressurizing roll, the heating plate, the cooling and pressurizing roll, and the cooling plate, and the thermosetting resin material is impregnated into the fiber sheet. The heating and pressurizing roll 72 and the heating plate 73 were set to the temperature of 90° C., and the cooling and pressurizing roll 74 and the cooling plate 75 were cooled by the coolant. Moreover, the heating and pressurizing roll and the cooling and pressurizing roll were both set to the linear pressure of 20 kgf/cm. The working was performed by setting the working speed at 10 m/min.

(4) The thermosetting resin prepreg sheet PS in which the thermosetting resin material was impregnated into the fiber sheet ran through the cooling and pressurizing roll 74 and then, the release sheet 71 on the one surface side was peeled off and taken up by the bobbin together with the release sheet on the other surface side.

<Evaluation of Thermosetting Resin Prepreg Sheet>

The thermosetting resin prepreg sheet with the width of 180 mm, the fiber base weight of 160 g/m², and the resin base weight 88 g/m² could be continuously manufactured. The manufactured thermosetting resin prepreg sheet PS was in a state where fibers were linearly aligned apparently with favorable resin impregnation. Moreover, both of the surfaces had sufficient tackiness capable of being laminated in laminated molding in the subsequent process. Moreover, a pseudo isotropic laminated plate [45/0/−45/90] having a thickness of approximately 2 mm in which the manufactured thermosetting resin prepreg sheets were laminated was manufactured by an autoclave molding method, and the laminated plate without a void and in a state with favorable fiber dispersibility was molded in sectional observation of the laminated plate.

REFERENCE SIGNS LIST 1 fiber sheet supply portion
11 thread feeder
12 driving motor
13 width position guide roll
14 height position guide roll
2 resin transfer sheet supply portion
3 transfer heating treatment portion
31 heating roll
32 pressurizing roll
33 release sheet
34 release belt
4 transfer cooling treatment portion
41 cooling roll
42 pressurizing roll
5 opening treatment portion
51 air opening treatment portion
511 guide roll
512 deflection forming member
513 wind tunnel pipe
514 flow control valve
515 intake pump
516 hot air blower
517 rotation driving motor
52 lateral vibration opening treatment portion
521 rotating roll
522 supporting roll
523 crank motor
524 crank mechanism
6 carrying portion
61 comma roll
62 doctor edge 63 applying roll
64 liquid reservoir member
65 backup roll
7 impregnation treatment portion
71 release sheet
72 heating and pressurizing roll
73 heating plate
74 cooling and pressurizing roll
75 cooling plate
76 release belt
81 cover film
C fiber bundle
CS fiber sheet
TS transfer sheet
TB transfer belt
R thermosetting resin material
RS resin transfer sheet
FS composite sheet
PS thermosetting resin prepreg sheet
M1 molding device for composite sheet
M2 manufacturing device for thermosetting resin prepreg sheet

The invention claimed is:

1. A molding method for a composite sheet used for manufacturing a thermosetting resin prepreg sheet in which a thermosetting resin material is impregnated into a fiber sheet, the molding method comprising:

bringing a resin transfer sheet in which a thermosetting resin material of a predetermined thickness is carried on one surface of a transfer sheet into contact with one surface of the fiber sheet to be stacked on the fiber sheet;

subjecting the resin transfer sheet and the fiber sheet in the stacked state to a heating treatment or heating and pressurizing treatment; and subjecting the resin transfer sheet and the fiber sheet in the heated and stacked state to a cooling treatment or cooling and pressurizing treatment so that the thermosetting resin material is transferred to the fiber sheet and the thermosetting resin material is made to adhere to one surface side of the fiber sheet;

wherein assuming that density of the fibers included in the fiber bundle is $\rho_C$ g/cm$^3$, a base weight of the fiber sheet is $W_C$ g/m$^2$, density of the thermosetting resin material is $\rho_R$ g/cm$^3$, and a base weight of the thermosetting resin material carried on the transferred sheet is $W_R$ g/m$^2$, a thickness when the thermosetting resin material is integrated to the one surface side of the fiber sheet is more than $[\{(W_C/\rho_C)/1000\}+\{(W_R/\rho_R)/1000\}]$ mm.

2. The molding method for a composite sheet according to claim 1, wherein when the resin transfer sheet and the fiber sheet in the stacked state are subjected to the heating treatment or heating and pressurizing treatment, a heating temperature is within a range from 30 to 80° C., and viscosity of the thermosetting resin material at the heating temperature is 100000 Pa·s or less.

3. The molding method for a composite sheet according to claim 1, wherein the thermosetting resin material is continuously brought into contact with the one surface of the fiber sheet while the thermosetting resin material is carried on the one surface of the transfer sheet.

4. The molding method for a composite sheet according to claim 1, wherein the fiber sheet has a base weight of 10 to 80 g/m$^2$.

5. The molding method for a composite sheet according to claim 1, wherein the thermosetting resin material carried on the transfer sheet has a base weight of 10 to 55 g/m$^2$.

6. The molding method for a composite sheet according to claim 1, wherein the thermosetting resin material carried on the transfer sheet is carried by being applied to the transfer sheet.

7. The molding method for a composite sheet according to claim 1, wherein the transfer sheet is formed in an endless state.

8. The molding method for a composite sheet according to claim 1, wherein the fiber sheet is formed by an opening treatment.

9. The molding method for a composite sheet according to claim 1, wherein after the resin transfer sheet is brought into contact with the one surface of the fiber sheet to be stacked on the fiber sheet, a release sheet is brought into contact with the other surface of the fiber sheet not in contact with the resin transfer sheet to be stacked on the fiber sheet.

10. A manufacturing method for a thermosetting resin prepreg sheet, comprising molding the composite sheet by the method of claim 1, and impregnating, by a heating and pressurizing treatment, a thermosetting resin material into a fiber bundle of the composite sheet form the thermosetting resin prepreg sheet.

11. The manufacturing method for a thermosetting resin prepreg sheet according to claim 10, wherein another fiber sheet is made to adhere to a surface side of the composite sheet to which the thermosetting resin material was transferred, and the thermosetting resin material is impregnated into both of the fiber sheets.

12. The manufacturing method for a thermosetting resin prepreg sheet according to claim 10, wherein a plurality of the composite sheets are stacked and molded by heating and pressurizing.

13. The manufacturing method for a thermosetting resin prepreg sheet according to claim 10, wherein a release sheet formed in an endless state is stacked on the composite sheet and molded by heating and pressurizing.

* * * * *